United States Patent
Zhang et al.

(10) Patent No.: US 10,181,919 B2
(45) Date of Patent: Jan. 15, 2019

(54) SYNCHRONIZATION METHOD, CONTROLLER, SYNCHRONIZATION NODE, SYNCHRONOUS NETWORK, AND STORAGE MEDIUM

(71) Applicant: ZTE CORPORATION, Shenzhen, Guangdong Province (CN)

(72) Inventors: Junhui Zhang, Shenzhen (CN); Li He, Shenzhen (CN); Bin Wang, Shenzhen (CN); Lin Wen, Shenzhen (CN); Hongguang Zhao, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 0 days.

(21) Appl. No.: 15/311,192

(22) PCT Filed: Sep. 12, 2014

(86) PCT No.: PCT/CN2014/086453
§ 371 (c)(1),
(2) Date: Jan. 3, 2017

(87) PCT Pub. No.: WO2015/172476
PCT Pub. Date: Nov. 19, 2015

(65) Prior Publication Data
US 2018/0131459 A1    May 10, 2018

(30) Foreign Application Priority Data
May 16, 2014 (CN) .......................... 2014 1 0209706

(51) Int. Cl.
*H04J 3/06* (2006.01)
*H04J 3/12* (2006.01)
(Continued)

(52) U.S. Cl.
CPC .......... *H04J 3/0641* (2013.01); *H04J 3/0679* (2013.01); *H04J 3/12* (2013.01); *H04J 3/14* (2013.01); *H04L 41/12* (2013.01)

(58) Field of Classification Search
CPC ...... H04J 3/0641; H04J 3/0658; H04J 3/0667; H04J 3/0679; H04W 36/0066; H04W 88/06
See application file for complete search history.

(56) References Cited

U.S. PATENT DOCUMENTS 8,867,520 B2 * 10/2014 Nicholls ............... H04J 3/0688
370/350
2010/0329284 A1 12/2010 Wong et al.
(Continued)

FOREIGN PATENT DOCUMENTS

CN    1770701 A    5/2006
CN    101043316 A    9/2007
(Continued)

OTHER PUBLICATIONS

Cooperation of G.781 and BMCA in telecom profile for time; Nokia Siemens Networks; Helsinki, Finland Jun. 4-8, 2012; pp. 1-4, XP017573695.

*Primary Examiner* — Chandrahas B Patel
(74) *Attorney, Agent, or Firm* — Ling Wu; Stephen Yang; Ling and Yang Intellectual Property

(57) ABSTRACT

The present document discloses a synchronization method, herein the method includes a controller determining synchronization link topology information according to physical link topology information of the synchronous network and synchronization information of a synchronous node in the synchronous network; the controller generating a synchronization rule of the synchronous node according to the synchronization link topology information; and the controller transmitting the synchronization rule and/or a request (Continued)

message to the synchronous node in the synchronous network according to the synchronization link topology information. The present document further discloses a controller, a synchronous node, a synchronous network, and a storage medium.

18 Claims, 19 Drawing Sheets

(51) Int. Cl.
*H04J 3/14* (2006.01)
*H04L 12/24* (2006.01)

(56) References Cited

U.S. PATENT DOCUMENTS

| | | |
|---|---|---|
| 2011/0142078 A1 | 6/2011 | Wong et al. |
| 2013/0039220 A1 | 2/2013 | Ruffini et al. |

FOREIGN PATENT DOCUMENTS

| | | |
|---|---|---|
| CN | 102075317 A | 5/2011 |
| CN | 103166750 A | 6/2013 |
| CN | 103634091 A | 3/2014 |
| WO | 200239630 A2 | 5/2002 |

\* cited by examiner

SYNCHRONIZATION METHOD, CONTROLLER, SYNCHRONIZATION NODE, SYNCHRONOUS NETWORK, AND STORAGE MEDIUM

TECHNICAL FIELD

The present document relates to the field of network communications, and in particular, to a synchronization method, a controller, a synchronous node, a synchronous network and a storage medium which are applicable to a Software Defined Network (SDN).

BACKGROUND OF THE RELATED ART

The existing communication networks such as a Packet Transport Network (PTN) can be divided into frequency synchronous networks and time synchronous networks. Herein, the frequency synchronous networks use a Synchronous Ethernet (SyncE) or a Precision Time Protocol (PTP) to extract clock information from a physical code stream or a packet message, and adopt a Synchronization Status Message (SSM) for frequency source selection and path switching; while the time synchronous networks use the PTP to extract timestamp information from a timing message, calculate a time deviation and perform time calibration. The time synchronous networks use the PTP for time source selection and path switching. There are several thousand devices in the PTN, which leads to a heavy workload to maintain the network. Each device in the PTN can be used as a Network Node (NE), and once a reference source and/or a synchronization link in the PTN fails, as the existing PTN lacks an effective switching mechanism when the failure occurs, it cannot guarantee the real-time performance of switching of the synchronization link.

SUMMARY

In view of this, in order to solve the problem in the existing technology, embodiments of the present document provide a synchronization method, a controller, a synchronous node, a synchronous network, and a storage medium, which are capable of rapidly switching a synchronization link so as to satisfy the real-time performance of switching of the synchronization link, thereby effectively improving the synchronization performance of the entire network.

The technical solutions according to the embodiments of the present document are realized as follows.

In a first aspect, an embodiment of the present document provides a synchronization method, including:

a controller determining synchronization link topology information of a synchronous network according to physical link topology information of the synchronous network and synchronization information of a synchronous node in the synchronous network;

the controller generating a synchronization rule of the synchronous node according to the synchronization link topology information; and the controller transmitting the synchronization rule and/or a request message to the synchronous node in the synchronous network according to the synchronization link topology information.

In a second aspect, an embodiment of the present document provides a synchronization method, including:

a synchronous node receiving a synchronization rule and/or a request message carrying the synchronization rule transmitted by a controller; and the synchronous node locking a best valid reference source according to the synchronization rule, and outputting information of the reference source to another port.

In a third aspect, an embodiment of the present document provides a controller including a first determination unit, a generation unit and a first transmission unit, herein the first determination unit is arranged to determine synchronization link topology information of a synchronous network according to physical link topology information of the synchronous network and synchronization information of a synchronous node in the synchronous network;

the generation unit is arranged to generate a synchronization rule of the synchronous node according to the synchronization link topology information; and the first transmission unit is arranged to transmit the synchronization rule and/or a request message to the synchronous node in the synchronous network according to the synchronization link topology information.

In a fourth aspect, an embodiment of the present document provides a synchronous node, including a second reception unit and a lock unit, wherein the second reception unit is arranged to receive a synchronization rule and/or a request message carrying the synchronization rule transmitted by a controller; and the lock unit is arranged to lock a best valid reference source according to the synchronization rule, and output information of the reference source to another port.

In a fifth aspect, an embodiment of the present document provides a synchronization method, including:

a controller determining synchronization link topology information according to physical link topology information of a synchronous network and synchronization information of a synchronous node in the synchronous network;

the controller generating a synchronization rule of the synchronous node according to the synchronization link topology information;

the controller transmitting the synchronization rule and/or a request message to the synchronous node in the synchronous network according to the synchronization link topology information, herein the synchronization rule is carried in the request message;

the synchronous node receiving the synchronization rule and/or the request message; and the synchronous node locking a best valid reference source according to the synchronization rule, and outputting information of the reference source to another port.

In a sixth aspect, an embodiment of the present document provides a synchronous network including a controller and a synchronous node, herein the controller includes a first determination unit, a generation unit and a first transmission unit, and the synchronous node includes a second reception unit and a lock unit, herein the first determination unit is arranged to determine synchronization link topology information according to physical link topology information of the synchronous network and synchronization information of a synchronous node in the synchronous network;

the generation unit is arranged to generate a synchronization rule of the synchronous node according to the synchronization link topology information;

the first transmission unit is arranged to transmit the synchronization rule and/or a request message to the second reception unit in the synchronous network according to the synchronization link topology information, herein the synchronization rule is carried in the request message;

the second reception unit is arranged to receive the synchronization rule and/or the request message transmitted by the first transmission unit; and the lock unit is arranged to lock a best valid reference source according to the synchronization rule, and output information of the reference source to another port.

In a seventh aspect, an embodiment of the present document provides a computer storage medium, in which computer executable instructions are stored, wherein the computer executable instructions are used for performing the synchronization method provided in the first aspect of the embodiment of the present document, and/or the computer executable instructions are used for performing the synchronization method provided in the second aspect of the embodiment of the present document.

The embodiments of the present document provide a synchronization method, a controller, a synchronous node, a synchronous network and a storage medium, herein, a controller in a synchronous network determining synchronization link topology information according to physical link topology information of the synchronous network and synchronization information of a synchronous node in the synchronous network; the controller generating a synchronization rule of the synchronous node according to the synchronization link topology information; and the controller transmitting the synchronization rule and/or a request message to the synchronous node in the synchronous network according to the synchronization link topology information. This can rapidly enable switching of the synchronization link so as to satisfy the real-time performance of the switching of the synchronization link, thereby effectively improving the synchronization performance of the entire network.

BRIEF DESCRIPTION OF DRAWINGS

FIG. 1-2 is a flowchart of switching when a synchronization link in a PTN fails in the existing technology;

FIG. 1-3 is a flowchart of switching when a synchronization link in an SDN fails in the existing technology;

FIG. 2-1 is a first diagram of implementation of a synchronization method according to embodiment one of the present document;

FIG. 2-2 is a second diagram of implementation of a synchronization method according to embodiment one of the present document;

FIG. 2-3 is a third diagram of implementation of a synchronization method according to embodiment one of the present document;

FIG. 2-4 is a first diagram of implementation of a synchronization method according to embodiment two of the present document;

FIG. 2-5 is a second diagram of implementation of a synchronization method according to embodiment two of the present document;

FIG. 3 is a timing diagram of a synchronization method according to embodiment three of the present document;

FIG. 4 is a timing diagram of a synchronization method according to embodiment four of the present document;

FIG. 5 is a timing diagram of a synchronization method according to embodiment five of the present document;

FIG. 7-1 is a structural diagram of a network when the network is not abnormal according to embodiment seven of the present document;

FIG. 7-2 is a first structural diagram of a network when the network is abnormal according to embodiment seven of the present document;

FIG. 7-3 is a second structural diagram of a network when the network is abnormal according to embodiment seven of the present document;

FIG. 8-1 is a first structural diagram of a network when the network is abnormal according to embodiment eight of the present document;

FIG. 8-2 is a second structural diagram of a network when the network is abnormal according to embodiment eight of the present document;

FIG. 8-3 is a third structural diagram of a network when the network is abnormal according to embodiment eight of the present document;

FIG. 9-1 is a first constitutional structural diagram of a controller according to embodiment nine of the present document;

FIG. 9-2 is a second constitutional structural diagram of a controller according to embodiment nine of the present document;

FIG. 9-3 is a third constitutional structural diagram of a controller according to embodiment nine of the present document;

FIG. 10-1 is a first constitutional structural diagram of a synchronous node according to embodiment ten of the present document;

FIG. 10-2 is a second constitutional structural diagram of a synchronous node according to embodiment ten of the present document;

FIG. 10-3 is a third constitutional structural diagram of a synchronous node according to embodiment ten of the present document;

FIG. 11-1 is a first constitutional structural diagram of a synchronous network according to embodiment eleventh of the present document; and FIG. 11-2 is a second constitutional structural diagram of a synchronous network according to embodiment eleventh of the present document.

SPECIFIC EMBODIMENTS

Figure 1:
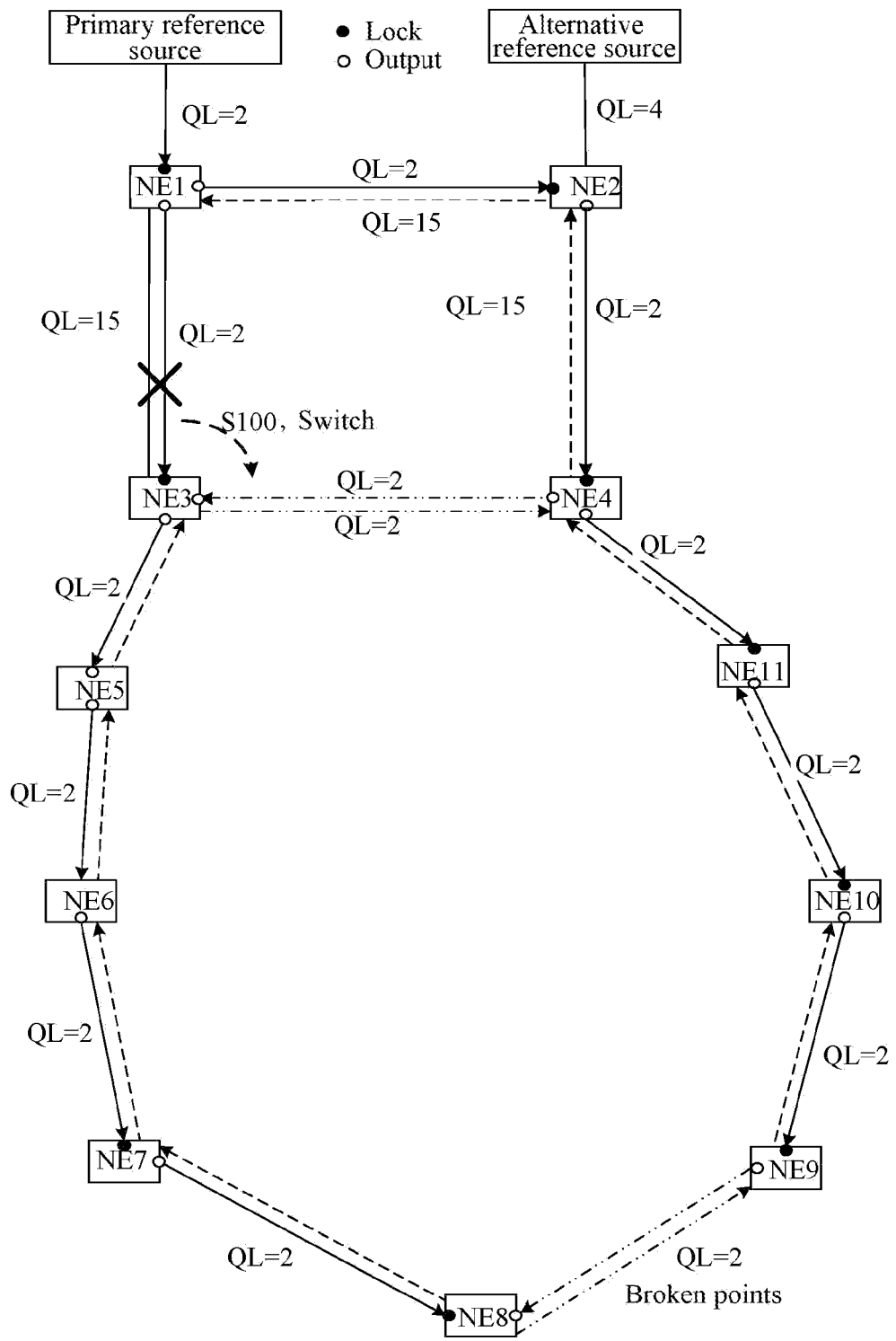
FIG. 1-1 is a structural diagram when a synchronization link in a PTN fails in the existing technology.

In a PTN, when a reference source or a synchronization link fails, a synchronous node selects the best input reference source (which may be simply referred to as a reference source) by running a reference source selection algorithm and switches to the new best input reference source as soon as possible. Herein the selection algorithm includes an SSM-based SSM protocol or a PTP. As shown in FIG. 1-1, a PTN network totally includes 11 nodes which are NE1 to NE11, as well as two clock reference sources, i.e., primary and secondary clock reference sources which are simply referred to as primary and secondary reference sources. Herein, each node NE includes two or more ports. In FIG. 1-1, only two or three node ports are shown. For example, node NE1 has three ports, including: an input port for connecting the primary reference source, i.e., a lock port of NE1 in FIG. 1-1, and two output ports for respectively connecting nodes NE2 and NE3, i.e., two output ports of NE1. In FIG. 1-1, the lock port is represented by a solid dot, and the output ports are represented by hollow dots and are also referred to as export ports. Each synchronization link in FIG. 1-1 has a clock Quality Level (QL) marked thereon. In the ITU-TG707 standard, an S1 byte in the SSM is defined to transfer synchronization status information. The QL levels of the SSM from high to low are QL=0000=0 which indicates that the synchronization quality is unknown; QL=0010=2 which indicates a first level of clock; QL=0100=4 which indicates a second level of clock; QL=1000=8 which indicates a third level of clock; QL=1011=11 which indicates a Synchronous Digital Hierarchy (SDH) device clock; and QL=1111=15 which indicates being unavailable, i.e., being unavailable to be used as a synchronous clock. Since the primary reference source with QL=2 is currently used, the QL of the synchronization link is equal to 2 in FIG. 1-1. Assuming that the input reference source of node NE3 fails, for example, when a synchronization link between node NE1 and the node NE3 fails, the node NE3 needs to switch to a new reference source as soon as possible, i.e., proceeding to a step of switching in step S100. The switching for the node NE3 is required to be completed within a few hundred milliseconds (ms); otherwise the synchronization performance of all the downstream nodes of the node NE3 will be affected.

Figures 1, 2:
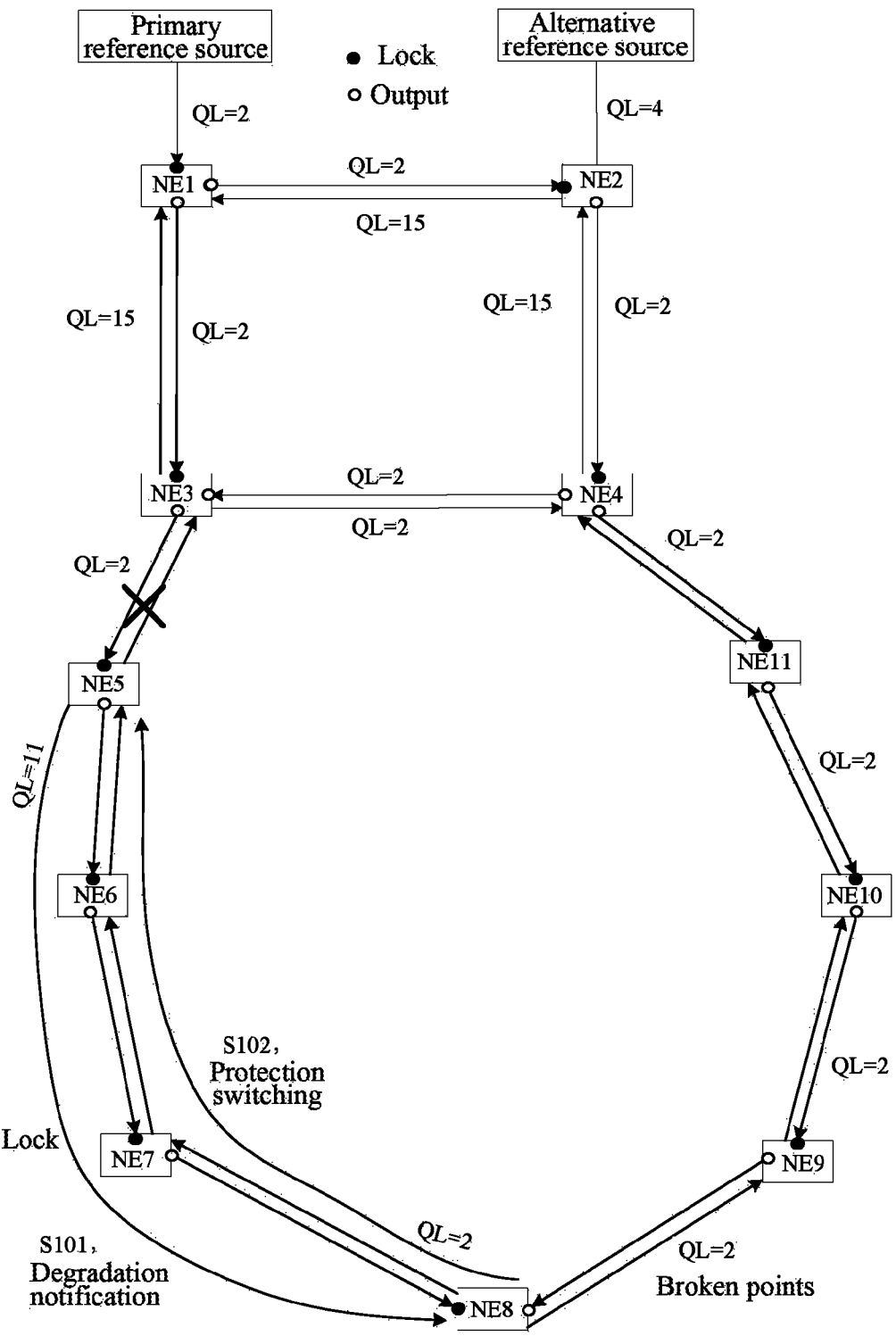

As shown in FIG. 1-2, when the link between the node NE3 and node NE5 fails, it is delivered to the node NE5 through an SSM message carrying failure information. The node NE5 will run the reference source selection algorithm according to the SSM protocol. After calculation using the algorithm, it is found that the node NE5 does not have a better reference source, and then the node NE5 enters a hold state. The node NE5 proceeds to a step of notifying degradation in step S101, which includes: the node NE5 notifying the downstream of the degraded clock quality level (QL=11, i.e., the SDH device clock). Since there is no better reference source, the downstream nodes NE6 and NE7 will continue to lock the NE5 and notify the downstream of the degraded reference source clock quality level (QL=11). The SSM message carrying QL=11 is delivered to node NE8 hop by hop. The node NE8 will run the reference source selection algorithm according to the SSM protocol. After calculation using the algorithm, a reference source with QL=2 will be selected and the node NE8 will lock a reference source in the NE9 direction. Then, the node NE5 proceeds to a step of protection switching illustrated in step S102, which includes: the node NE8 notifying the downstream of a new reference source quality level (QL=2). The SSM message carrying the QL=2 is notified to the nodes NE7, NE6 and NE5 hop by hop. The nodes NE7 to NE5 run the reference source selection algorithm and switch to the new reference source one by one. There is a delay in the hop-by-hop delivery of the above SSM message. A total switching delay increases with the number of hops, which affects the frequency synchronization performance and the time synchronization performance.

In addition, if there is no alternative reference source downstream of the failed node, but there is a synchronous node with higher quality, it needs to notify the failed node to enter a hold state as soon as possible. As shown in FIG. 1-2, when the link between the node NE3 and the node NE5 fails, for the downstream nodes NE6 to NE8 of the node NE5, there is no alternative reference source for the nodes NE6 to NE8, but the NE8 has a synchronous node NE9 with a quality level QL=2 which is higher than the quality level QL=11. However, there is a delay in the use of the hop-by-hop forwarding mechanism as shown in FIG. 1-2, and it is impossible to notify a Time Slave Clock (TSC) node NE8 at the end to enter a hold mode as soon as possible.

Figures 1, 2, 3:
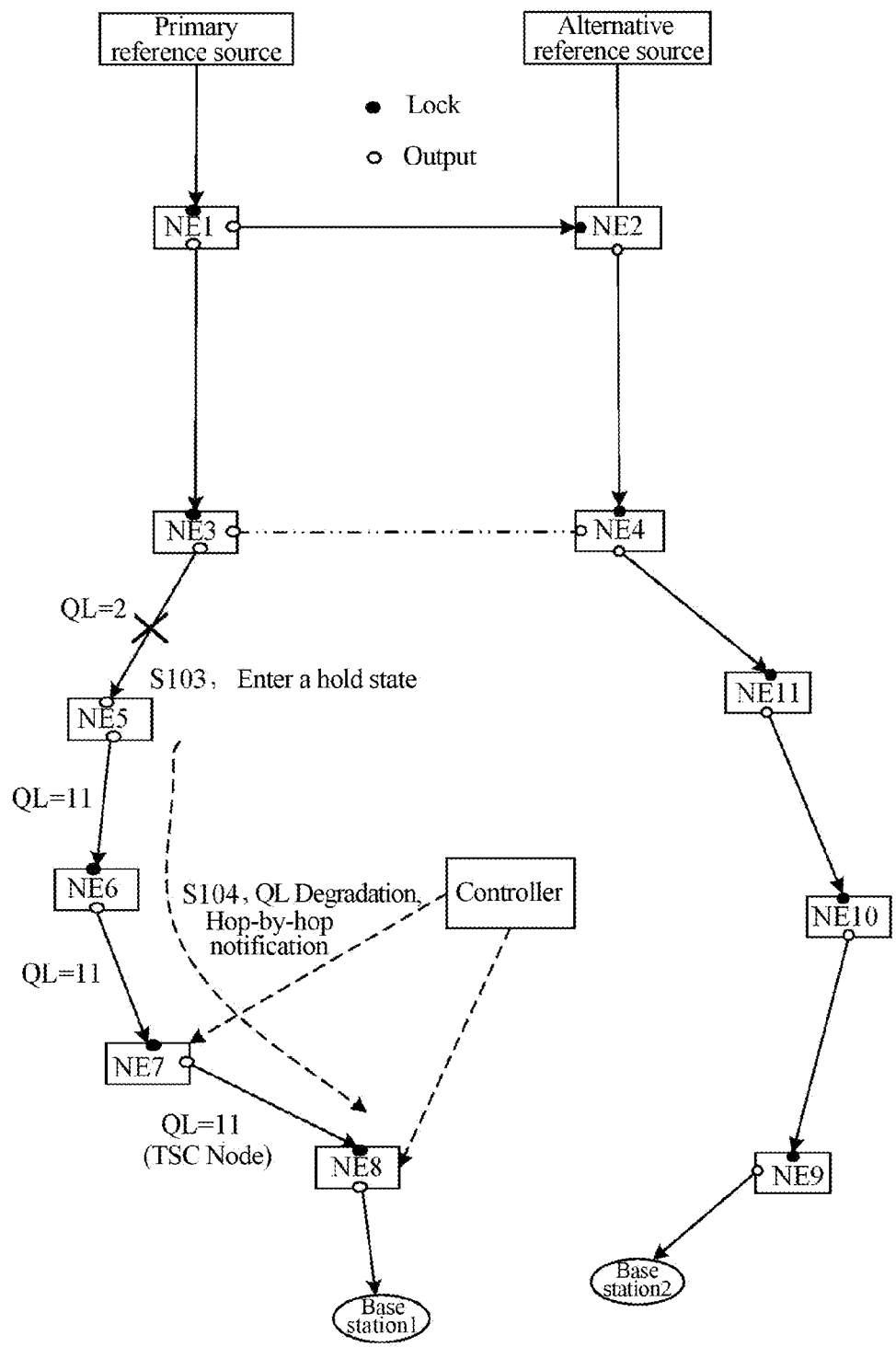

For the problems in FIG. 1-1 and FIG. 1-2, the control and forwarding separation architecture is adopted in the SDN technology. That is, a synchronization link topology is calculated by a controller, and frequency synchronization and/or time synchronization are performed by a synchronous device. However, the protection switching of the synchronization link has strict time requirements, and it is required to switch to a backup synchronization link as soon as possible in the event of failure to meet the requirements of performance indexes in the existing standard specifications. However, the synchronous network is deployed in an SDN manner. If the synchronization link is switched completely by the controller, the real-time performance of switching of the synchronization link cannot be satisfied due to the uncertainty of the message delay and the processing delay between the controller and the device. As shown in FIG. 1-3, it is assumed that the link between the node NE3 and the node NE5 fails, and then the node NE5 proceeds to a step of entering a hold state in step S103. Then, the synchronous network proceeds to a step of QL degradation and hop-by-hop notification in step S104. At the beginning, the node NE8 locks the node NE7, and then the controller instructs switching of the node NE8 and the node NE7. However, due to uncertainty of the communication delay, the node NE7 firstly performs switching, which causes the node NE7 to lock the node NE8. However, at this time the node NE8 still locks the node NE7, which results in interlocking of the synchronization link of the node NE7 and the node NE8. Although the interlocking time is short, it still brings an uncertain influence factor to the performance of the entire synchronous network.

The technical solutions of the present document will be further described in detail below with reference to accompanying drawings and specific embodiments.

Embodiment One

The embodiment one of the present document provides a synchronization method applied to a controller in a synchronous network. As an alternative embodiment, the synchronous network may be an SDN, and correspondingly, the controller may be a controller in the SDN. FIG. 2-1 is a first flowchart of implementation of a synchronization method according to the embodiment one of the present document. As shown in FIG. 2-1, the method includes the following steps.

In step S211, the controller in the synchronous network determines synchronization link topology information of the synchronous network according to physical link topology information of the synchronous network and synchronization information of a synchronous node in the synchronous network.

Here, the synchronization information includes at least one of the following: clock Quality Level (QL) information, port priority information, hop number information, synchronization capability information etc.

The node in the synchronous network refers to a synchronous node controlled by the controller. That is, the controller determines the synchronization link topology information of the synchronous network according to the physical link information of the synchronous network and the synchronization information of the synchronous node controlled by the controller. The synchronization capability information can indicate whether the synchronous node has the capability to support frequency synchronization and/or time synchronization and, furthermore, can indicate whether a port of the synchronous node has the capability to support frequency synchronization and/or time synchronization.

In step S212, the controller generates a synchronization rule of the synchronous node according to the synchronization link topology information.

Here, the synchronization rule may also be referred to as a synchronization strategy and includes input and output port information of the synchronous node, port priority information, identity (ID) information of each input reference source (optional), quality level information of each input reference source (optional), and priority information of each input reference source etc. The synchronization method and apparatus according to the embodiments of the present document can be applied to a time synchronous network, a frequency synchronous network, or both a frequency synchronous network and a time synchronous network. When an embodiment of the present document is implemented in a time synchronous network, the synchronization rule further includes transmission rates of timing messages of various input and output interfaces/ports and operation modes such as a single-step method, a two-step method etc., herein a type of the timing message includes Sync, Follow_up, Delay_req, Delay_resp, Pdelay_req, Pdelay_resp etc.

Here, the synchronization rule includes at least one of the following strategies:

a strategy when the input reference source of the synchronous node has no alarm;

a strategy when the input reference source of the synchronous node has an alarm; and a strategy when the synchronous node receives a switching message from a downstream node, herein the switching message is used to indicate to the synchronous node how to perform switching.

In step S213, the controller transmits the synchronization rule and/or a request message to the synchronous node in the synchronous network according to the synchronization link topology information.

Here, the request message is used to indicate the synchronous node controlled by the controller to establish a synchronization link according to the synchronization rule.

Here, the controller transmitting the synchronization rule and/or a request message to the synchronous node in the synchronous network according to the synchronization link topology information includes:

the controller transmitting the synchronization rule to the synchronous node in the synchronous network according to the synchronization link topology information; or the controller transmitting the request message to the synchronous node in the synchronous network according to the synchronization link topology information; or the controller transmitting the synchronization rule and the request message to the synchronous node in the synchronous network according to the synchronization link topology information.

Herein, the controller transmitting the synchronization rule and the request message to the synchronous node in the synchronous network according to the synchronization link topology information includes:

the controller firstly transmitting the synchronization rule to the synchronous node in the synchronous network and then transmitting the request message to the synchronous node in the synchronous network according to the synchronization link topology information, herein the synchronization rule is not carried in the request message.

Herein, as an alternative embodiment, the controller transmitting the synchronization rule and the request message to the synchronous node in the synchronous network according to the synchronization link topology information includes:

the controller transmitting the request message to the synchronous node in the synchronous network according to the synchronization link topology information, herein the synchronization rule is carried in the request message.

In the embodiment of the present document, before the step S211, as shown in FIG. 2-2, the method further includes the following steps.

In step S210, after being powered on, the controller acquires the synchronization information of the synchronous node in the synchronous network and detects a physical connection relationship of ports between synchronous nodes to acquire the physical link topology information.

In the embodiment of the present document, in addition to the steps shown in FIG. 2-2, as shown in FIG. 2-3, after step S213, the method further includes the following steps.

In step 214, the controller updates the synchronization link topology information and/or the synchronization rule after receiving a switching completion message transmitted by the synchronous node.

The step S214 includes:

after receiving the switching completion message transmitted by the synchronous node, the controller updating the synchronization link topology information; or after receiving the switching completion message transmitted by the synchronous node, the controller updating the synchronization rule; or after receiving the switching completion message transmitted by the synchronous node, the controller updating the synchronization link topology information and the synchronization rule.

Here, in the present embodiment, there are provided two manners of updating the synchronization link topology information and the synchronization rule, herein the first manner includes the following steps.

In step A1, the controller updates the synchronization link topology information according to the physical link topology information of the synchronous network and the synchronization information of the synchronous node in the synchronous network.

In step A2, the controller updates the synchronization rule according to the synchronization link topology information.

When the switching completion message carries the identity information of the best reference source, correspondingly, the second manner includes the following step. In step B, the controller updates the synchronization link topology information and the synchronization rule according to the identity information of the best reference source.

In the embodiment of the present document, the method further includes:

the controller determining a synchronous node required to be resynchronized according to the updated synchronization link topology information; and the controller carrying the updated synchronization link topology structure information and the synchronization rule in an established request message and transmitting the request message to the synchronous node required to be resynchronized.

In the embodiment of the present document, the method further includes:

the controller receiving a failure message transmitted by the synchronous node to indicate that there is no other valid reference source; and the controller judging whether there is an alternative reference source for all the downstream nodes of the synchronous node, and if there is an alternative reference source for all the downstream nodes of the synchronous node, transmitting a switching request message to a downstream node having the alternative reference source to indicate switching to the alternate reference source.

In the embodiment of the present document, the method further includes:

when judging that there is no alternative reference source for all the downstream nodes of the synchronous node, the controller determining a first downstream node having a clock with a higher quality level or better hold performance from the downstream nodes of the synchronous node; and the controller transmitting a hold request message to the first downstream node to request the first downstream node to enter a hold mode.

Embodiment Two

Figures 1, 2:
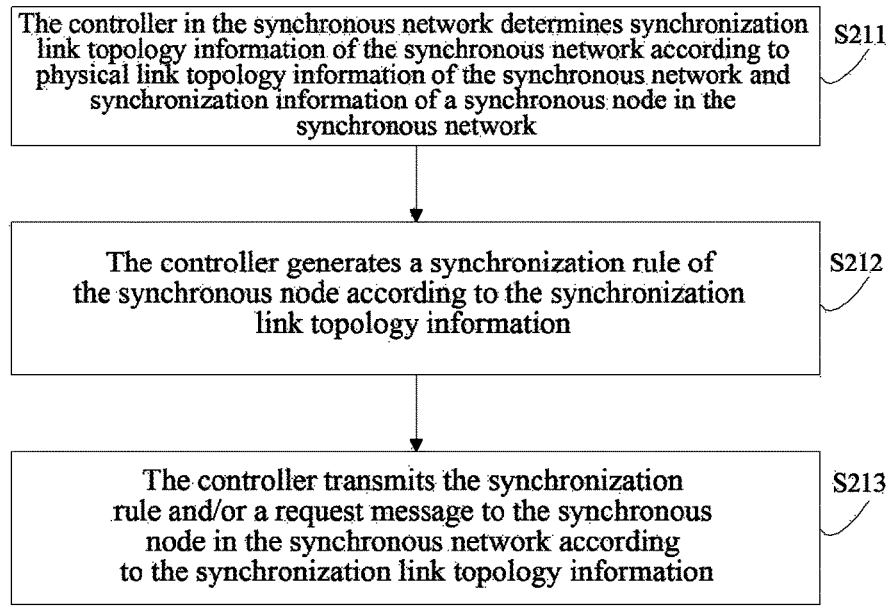
Figure 2:
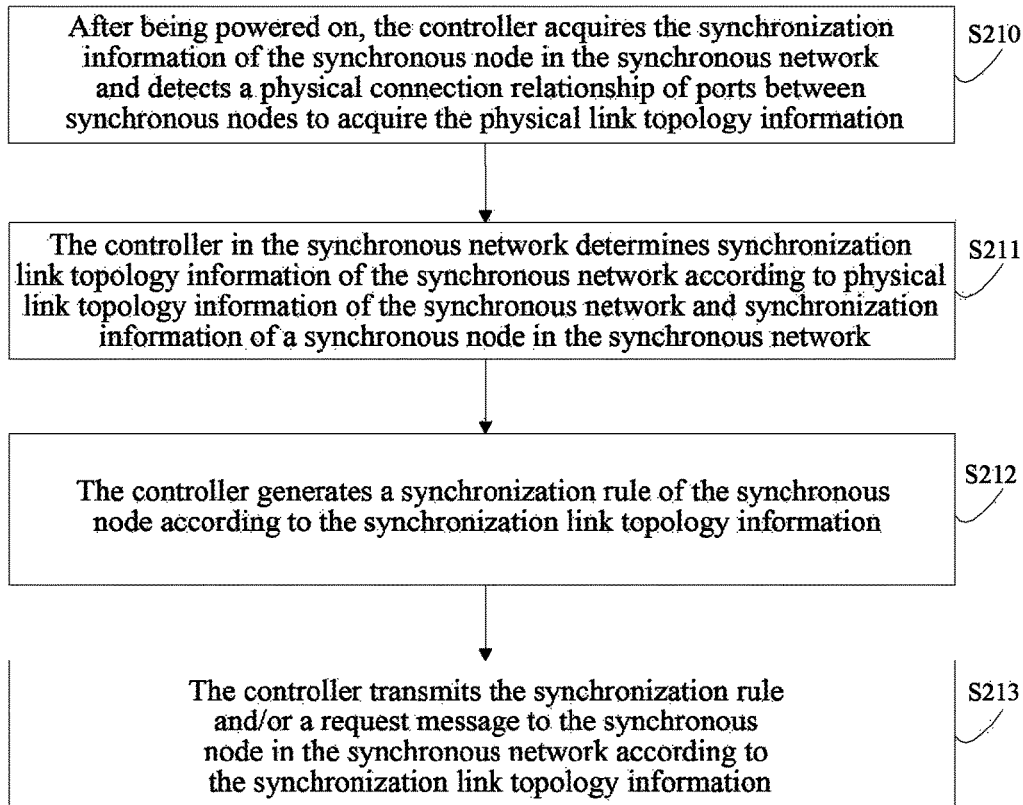
Figures 2, 3:
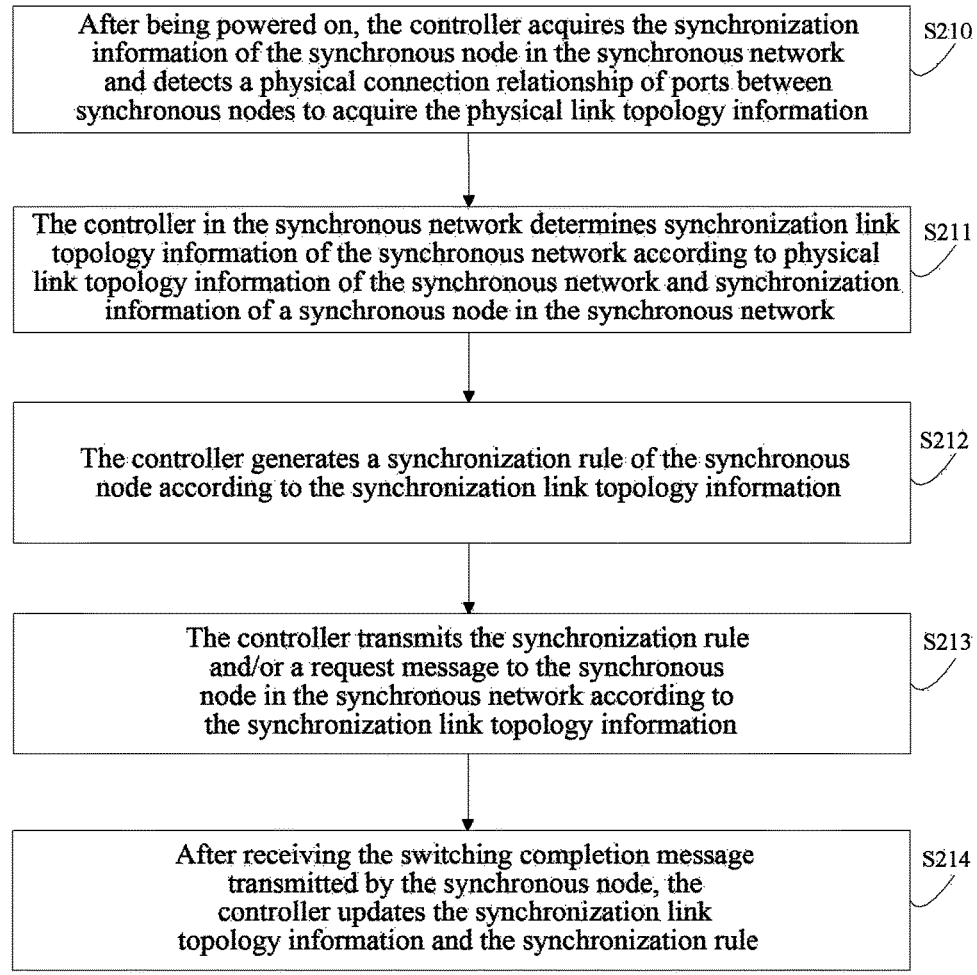
Figures 2, 3, 4:
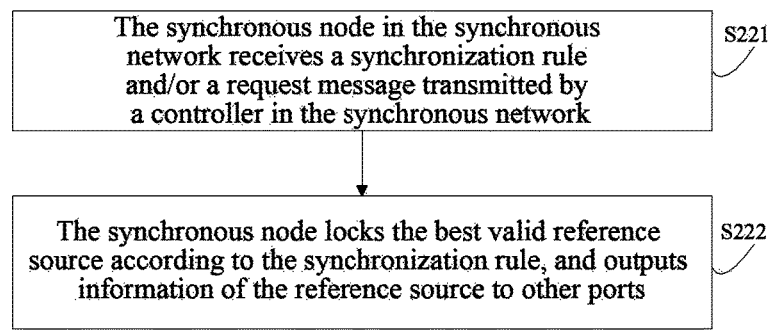

The embodiment two of the present document provides a synchronization method applied to a synchronous node in a synchronous network. As an alternative embodiment, the synchronous network may be an SDN, and correspondingly, the synchronous node may be a synchronous node in the SDN. FIG. 2-4 is a first flowchart of implementation of a synchronization method according to the embodiment two of the present document. As shown in FIG. 2-4, the method includes the following steps:

In step S221, the synchronous node in the synchronous network receives a synchronization rule and/or a request message transmitted by a controller in the synchronous network.

Here, the synchronous node receiving the synchronization rule and/or the request message transmitted by the controller in the synchronous network includes:

the synchronous node receiving the synchronization rule transmitted by the controller in the synchronous network; or the synchronous node receiving the request message transmitted by the controller in the synchronous network; or the synchronous node receiving the synchronization rule and the request message transmitted by the controller in the synchronous network.

Herein, the synchronous node receiving the synchronization rule and the request message transmitted by the controller in the synchronous network includes:

the synchronous node receiving the synchronization rule transmitted by the controller in the synchronous network and then receiving the request message for establishing a synchronization link transmitted by the controller.

Herein, the synchronous node receiving the synchronization rule and the request message transmitted by the controller in the synchronous network includes: the synchronous node receiving the request message transmitted by the controller in the synchronous network, herein the synchronization rule is carried in the request message.

In step S222, the synchronous node locks the best valid reference source according to the synchronization rule, and outputs information of the reference source to other ports.

Here, the information of the reference source includes frequency and/or time information; and locking the best valid reference source includes locking a frequency and/or time of an input port of the best valid reference source.

Here, the best valid reference source may be an input reference source with the highest priority, or may also be an input reference source with the highest quality level information. Those skilled in the art can further determine the best valid reference source according to various existing technologies, which therefore will not be repeated.

In the embodiment of the present document, after the step S222, as shown in FIG. 2-5, the method further includes the following steps.

In step S223, the synchronous node judges whether the input reference source has an alarm; and if the input reference source has an alarm, the synchronous node continues to judge whether there is another valid reference source according to the synchronization rule.

In step S224, the synchronous node switches to the best reference source according to the synchronization rule when determining that there is another valid reference source according to the synchronization rule.

In the embodiment of the present document, when the step S224 is performed, the method further includes:

the synchronous node updating a local synchronization rule and transmitting a switching completion message to the controller.

Here, the controller updates the synchronization link topology information and the synchronization rule only after receiving the switching completion message.

Here, the switching completion message only carries a switching completion identity, which is used to only notify the controller that the present synchronous node has completed the switching. In this case, as the controller itself includes the physical link topology information and synchronization information of all the nodes, therefore, the controller may update the synchronization link topology information according to the recitation of step S211 and update the synchronization rule according to the recitation of step S212. Thus, in this manner, update of both the synchronization link topology information and the synchronization rule is completed at the controller end, and therefore this manner is suitable for a synchronous network with a small number of synchronous nodes.

The switching completion message may carry identity information of the best reference source in addition to the switching completion identity. Compared with the previous manner in which only the switching completion identity is carried, for the manner in which the two kinds of identities are carried, as the switching completion message carries the switching completion identity, the controller can update the synchronization link topology information and the synchronization rule according to the switching completion identity more precisely, and thus can achieve rapid updating. Further, as the computational power consumed by the controller is relatively weakened when the synchronization link topology information and the synchronization rule are updated, the manner in which two identities are carried is suitable for a synchronous network with a large number of synchronous nodes.

In the embodiment of the present document, the method further includes:

the synchronous node which is required to be resynchronized receiving the request message transmitted by the controller, herein the request message carries the updated synchronization link topology information and synchronization rule;

the synchronous node which is required to be resynchronized locking the best valid reference source according to the synchronization rule and outputting information of the reference source to other ports.

In the embodiment of the present document, the method further includes:

when determining that there is no other valid reference source according to the synchronization rule, the synchronous node entering a hold mode and transmitting to the controller a failure message indicating that there is no other valid reference source.

In the embodiment of the present document, the method further includes:

after receiving a switching request message which indicates switching to an alternate reference source transmitted by the controller, the synchronous node switching to the alternative reference source and transmitting a switching message which indicates switching to a first upstream synchronous node.

In the embodiment of the present document, the method further includes:

after receiving the switching message, the first upstream synchronous node judging whether an input port which receives the switching message is legal according to the synchronization rule;

when it is judged to be illegal, discarding the switching message; and when it is judged to be legal, performing reference source switching according to the synchronization rule and transmitting a switching completion message to the controller; when determining that it has a valid input reference source, forwarding the switching message to a port having the valid input reference source to notify an upstream node or forwarding the switching message to the port having the valid input reference source to notify the upstream node after a delay time; and when determining that it does not have a valid input reference source, not forwarding the switching message.

Embodiment Three

The embodiment three of the present document provides a synchronization method applied to a synchronous network. The synchronous network includes a controller 300 and a number of synchronous nodes 380 controlled by the controller 300. As an alternative embodiment, the synchronous network may be an SDN. FIG. 3 is a timing diagram of a synchronization method according to the embodiment three of the present document. As shown in FIG. 3, the method includes the following steps.

In step S311, physical link topology information is acquired.

Specifically, the controller 300 acquires synchronization information of all the synchronous nodes in the synchronous network and detects a physical connection relationship of ports between all the synchronous nodes to acquire the physical link topology information. Alternatively, the step is performed when the synchronous network is powered on.

In step S312, the synchronization link topology information is determined.

Specifically, the controller in the synchronous network determines the synchronization link topology information of the synchronous network according to the physical link topology information of the synchronous network and the synchronization information of the synchronous node in the synchronous network.

Here, the synchronization information includes at least one of clock Quality Level (QL) information, port priority information, hop number information, synchronization capability information etc.

In step S313, a synchronization rule is generated.

The controller generates the synchronization rule of the synchronous node according to the synchronization link topology information.

In step S314, a request message is transmitted.

Specifically, the controller transmits a request message for establishing a synchronization link to the synchronous node in the synchronous network according to the synchronization link topology information, herein the request message carries the synchronization rule.

Here, the request message in step S314 may not carry the synchronization rule generated in step S313, and correspondingly, a step of transmitting the synchronization rule to the synchronous node is further included in step S313.

Here, in the present embodiment, the request message may not be transmitted to the synchronous node, but only the synchronization rule is transmitted to the synchronous node, and the synchronous node starts to execute step S315 after receiving the synchronization rule.

Here, the synchronization rule includes at least one of the following strategies.

A strategy when the input reference source of the synchronous node has an alarm: specifically, when the synchronous node detects an alarm, the synchronous node first judges whether the synchronous node itself has a plurality of valid reference sources, and if the synchronous node itself has a plurality of valid reference sources, the synchronous node switches to the best reference source according to the synchronization rule, and transmits a switching completion message to notify the controller; otherwise, the synchronous node enters a hold mode and transmits an alarm message to notify the controller.

A strategy of how to achieve switching when the synchronous node receives a switching message from a downstream node: the switching message is used to indicate to the synchronous node how to achieve switching, specifically, when the synchronous node receives the switching message transmitted by the downstream node, the synchronous node judges legitimacy of the switching message according to the synchronization rule. When it is judged that the switching message is illegal, the switching is not performed. When it is judged that the switching message is legal, the synchronous node performs switching according to the switching message and notifies the controller; and then judges whether a state of an input source after the switching is performed is valid, and when it is determined that the state of the input source is valid, continues to transmit the switching message to an output port; otherwise, does not transmit the switching message.

In step S315, locking and outputting are performed.

Specifically, after receiving the request message, each synchronous node 380 locks a frequency and/or time information of an input port of the best valid reference source according to the synchronization rule and outputs the frequency and/or time information to other output ports in the present synchronous node.

It should be noted that the step S314 in the present embodiment may also be divided into two steps, herein, in a first step, the controller 300 transmits the synchronization rule to each synchronous node 380; and in the second step, the controller 300 transmits a request message for establishing a synchronization link to each synchronous node 380 so that in the second step the synchronization rule may not be carried in the request message.

Embodiment Four

The embodiment four of the present document provides a synchronization method applied to a synchronous network. The synchronous network includes a controller 400 and a number of synchronous nodes controlled by the controller 400. After including steps S311-S315 illustrated in FIG. 3, the synchronization method in the embodiment four further includes the following steps as shown in FIG. 4.

In step S411, a synchronous node 410 detects an alarm.

Specifically, the synchronous node 410 controlled by the controller 400 detects failure of an input source, i.e., the synchronous node 410 detects an alarm.

In step S412, the synchronous node 410 judges whether there is a valid reference source; and if there is a valid reference source, the process proceeds to step S413.

Specifically, the synchronous node 410 judges whether the synchronous node 410 itself has another valid input reference source according to the synchronization rule, and if the synchronous node 410 itself has another valid input reference source according to the synchronization rule, the process proceeds to step S413.

In step S413, the synchronous node 410 switches to the best reference source and updates a local synchronization rule.

Specifically, if the synchronous node 410 judges that the synchronous node 410 itself has another valid input reference source according to the synchronization rule, the synchronous node 410 switches to the best input reference source according to priority information of input reference sources in the synchronization rule, and updates the local synchronization rule after the switching is performed.

In step S414, the synchronous node 410 transmits a switching completion message to the controller 400.

Here, the switching completion message transmitted from the synchronous node 410 to the controller 400 may be known with reference to the embodiment two, and therefore will not be repeated.

In step S415, the controller 400 updates the synchronization link topology information and the synchronization rule.

Here, update of the synchronization link topology information and the synchronization rule by the controller 400 can be known with reference to the embodiment two, and therefore will not be repeated; here, the controller 400 further needs to determine a synchronous node required to be resynchronized according to the updated synchronization link topology information.

In step S416, the controller 400 transmits a request message to the synchronous node 420 which is required to be resynchronized.

Specifically, the controller 400 carries the updated synchronization link topology structure information and synchronization rule in an established request message, and transmits the established request message to the synchronous node 420 which is required to be resynchronized.

In step S417, the synchronous node 420 which is required to be resynchronized performs locking and outputting.

Specifically, the synchronous node 420 which is required to be resynchronized receives a request message transmitted by the controller, herein the request message carries the updated synchronization link topology information and synchronization rule.

The synchronous node which is required to be resynchronized locks a frequency and/or time of an input port of the best valid reference source according to the synchronization rule and outputs the frequency and/or time information to other ports.

Embodiment Five

Figures 2, 3, 4, 5:
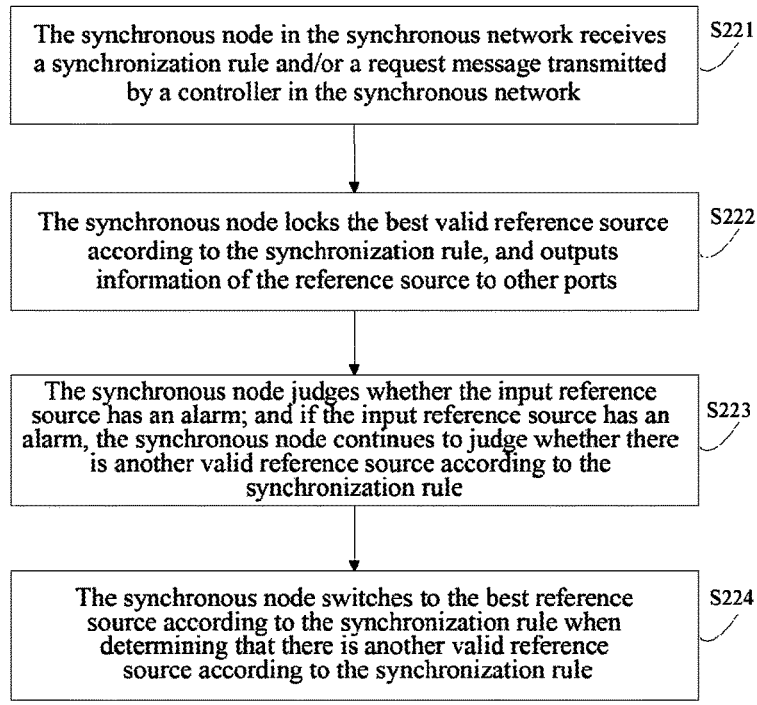
Figure 3:
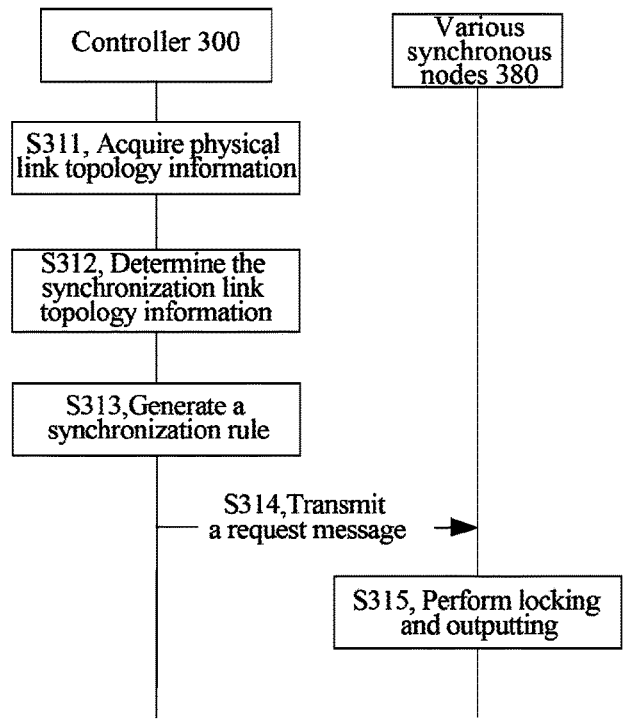
Figure 4:
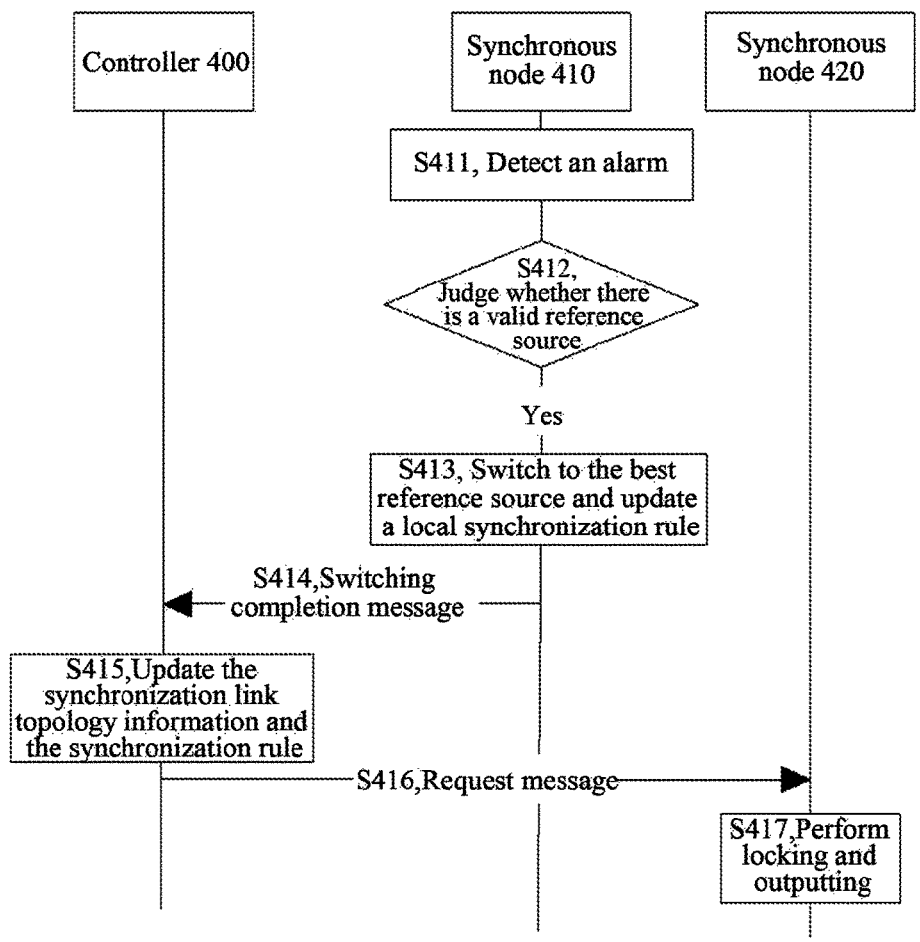
Figure 5:
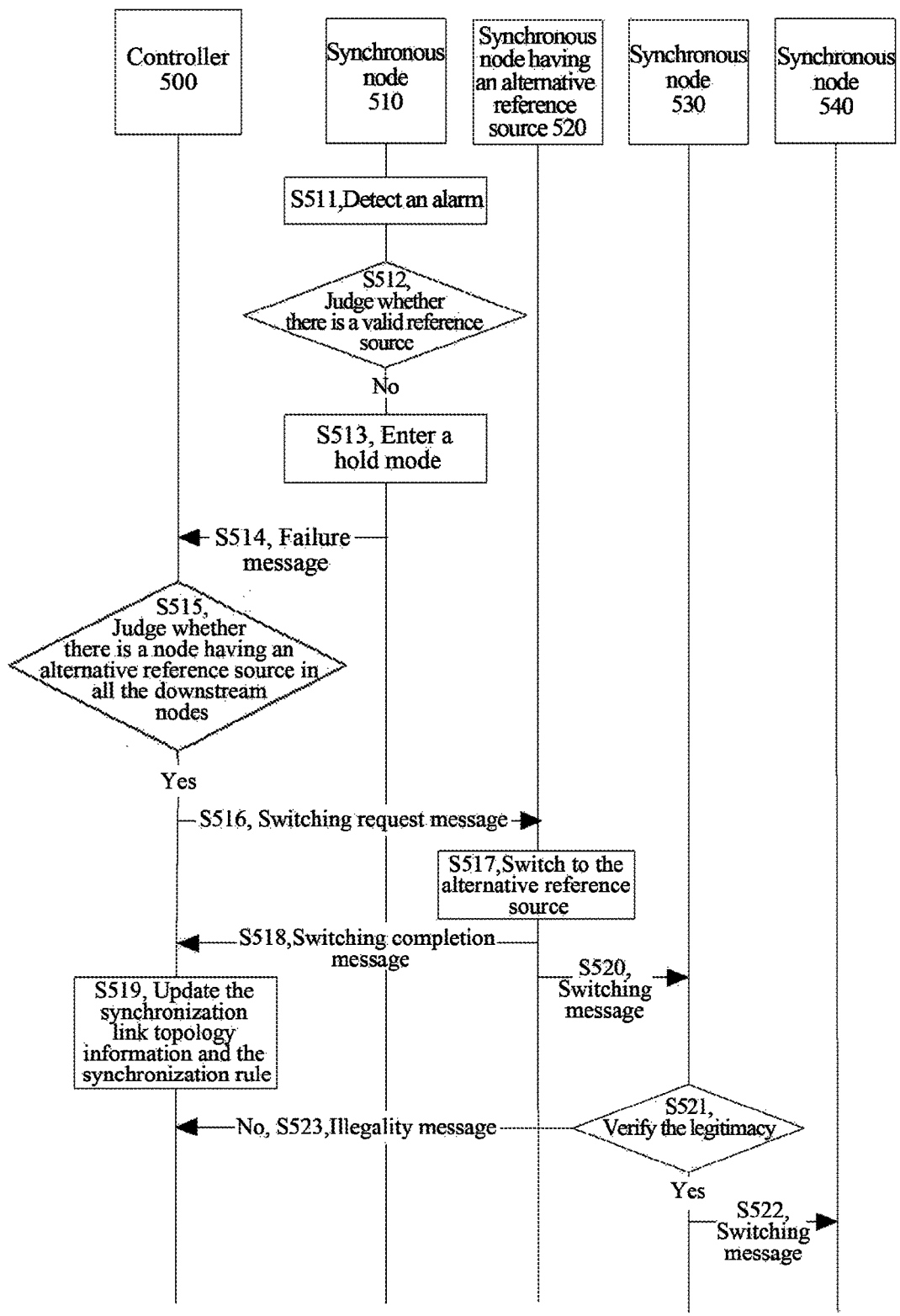

The embodiment five of the present document provides a synchronization method applied to a synchronous network. The synchronous network includes a controller 500 and a number of synchronous nodes controlled by the controller 500; after including steps S311-S315 illustrated in FIG. 3, the synchronization method in the embodiment five further includes the following steps as shown in FIG. 5.

In step S511, a synchronous node 510 detects an alarm, Specifically, the synchronous node 510 controlled by the controller 500 detects failure of an input source, i.e., the synchronous node 510 detects an alarm.

In step S512, the synchronous node 510 judges whether there is a valid reference source, and if there is no valid reference source, the process proceeds to step S513.

Specifically, the synchronous node 510 judges whether the synchronous node 510 itself has another valid input reference source according to the synchronization rule, and if the synchronous node 510 itself does not have another valid input reference source according to the synchronization rule, the process proceeds to step S513.

In step S513, the synchronous node 510 enters a hold mode.

Specifically, a phase locked loop in the synchronous node 510 enters a hold mode or a hold state when the synchronous node 510 judges that the synchronous node 510 itself does not have a valid input reference source. The phase locked loop entering a hold node or a hold state in step S513 belongs to the existing technology, and therefore will not be repeated.

In step S514, the synchronous node 510 transmits a failure message to the controller 500.

Specifically, the synchronous node 510 transmits the failure message to the controller 500 after entering the hold mode.

Here, the failure message is used to indicate that the synchronous node 510 has an alarm condition, that is, the synchronous network is abnormal. The controller 500 learns that the synchronous node 510 is abnormal through the failure message. Thus, a right of control of synchronization switching is handed over by the synchronous node 510 to the controller 500 through the failure message. In a subsequent step, switching of the synchronization link will be performed by the controller 500. Herein, the right of control of synchronization switching being handed over by the synchronous node 510 to the controller 500 can be specifically construed as follows: in the embodiment four of the present document, when the synchronous node 510 judges that the synchronous node 510 itself has a valid input reference source, the right of control of synchronization switching is possessed by the synchronization switch 510 itself; and in step S512 of the embodiment five, as the synchronous node 510 judges that the synchronous node 510 itself does not have a valid reference source, it needs to hand over the right of control of synchronization switching to the controller 500.

In step S515, the controller 500 judges whether there is a node having an alternative reference source in all the downstream nodes, and if there is a node having an alternative reference source in all the downstream nodes, the process proceeds to step S516.

Specifically, after receiving the failure message transmitted by the synchronous node 510, the controller 500 judges whether there is a node having an alternative reference source in all the downstream nodes of the synchronous node 510, and if there is a node having an alternative reference source in all the downstream nodes of the synchronous node 510, the process proceeds to step S516 (it is assumed that a node having an alternative reference source in the downstream nodes of the synchronous node 510 is synchronous node 520).

In step S516, the controller 500 transmits a switching request message to the downstream node 520.

Here, the switching request message is used to request a downstream node having an alternative input reference source to switch to the alternative input reference source and to request the downstream node having the alternative input reference source to transmit the switching message to its first upstream node. Specifically, by taking the synchronous node 520 in the present embodiment as an example, the switching request message is used to enable the downstream node 520 to switch to the alternative input reference source and to request the downstream node 520 to transmit a switching message to a first upstream node 530 of the node 520, herein it is assumed that the first upstream node of the downstream node 520 is the synchronous node 530.

In step S517, the synchronous node 520 switches to the alternative reference source.

Here, the synchronous node 520 receives the switching request message transmitted by the controller 500. The switching request message may further carry identity information of the alternative reference source, or may not carry the identity information of the alternative reference source. When the switching request message carries the identity information of the alternative reference source, the synchronous node 520 switches to the alternative input reference source according to the identity information of the alternative reference source. When the switching request message does not carry the identity information of the alternative reference source, the synchronous node 520 switches to the alternative input reference source according to the synchronization rule.

In step S518, the synchronous node 520 transmits a switching completion message to the controller 500.

Here, the switching completion message transmitted by the synchronous node 520 to the controller can be known with reference to the above-described embodiment two, and therefore will not be repeated.

In step S519, the controller 500 updates the synchronization link topology information and the synchronization rule.

Here, step S518 specifically can be known with reference to the above-described embodiment two, and therefore will not be repeated. Further, step S518 is associated with step S19, that is, step S518 occurs first, and step S519 occurs later.

In step S520, the synchronous node 520 transmits a switching message to the synchronous node 530.

Here, the synchronous node 530 is a first upstream node of the synchronous node 520.

Here, the switching message is used to indicate the first upstream node to perform switching. In addition, there is no sequential association between steps S520 and S518. Step S520 may occur before step S518 or occur after step S518.

In step S521, the synchronous node 530 verifies the legitimacy, and when it is legal, the process proceeds to step S522.

Specifically, after receiving the switching message transmitted by the synchronous node 520, the synchronous node 530 verifies the legitimacy of the received switching message, that is, the legitimacy of an input port for the switching message is verified according to output port information in the synchronization rule. If it is legal, the synchronous node 530 continues to judge whether the synchronous node 530 itself has a valid input reference source according to the synchronization rule, that is, whether the link fails; and if there is an input reference source which indicates that the link is normal, then forwards the switching message to the output port (the process proceeds to step S522); and otherwise, the process proceeds to step S523.

Here, the step S521 is an optional step, and the switching message may be transmitted directly to the upstream node without verification.

In step S522, the synchronous node 520 transmits the switching message to a synchronous node 540.

Here, the synchronous node 540 is the first upstream node of the synchronous node 530, i.e., the second upstream node of the synchronous node 530. At this time, the synchronous node 540 will still verify the legitimacy of the switching message; and when it is legal, the synchronous node 540 continues to transmit the switching message to its first upstream node, and then the first upstream node of the synchronous node 540 verifies the legitimacy of the switching message, and so on, until the switching message is delivered to the synchronous node 510 in the upstream direction.

In step S523, the synchronous node 530 transmits an illegality message to the controller 500.

Specifically, when verifying that the received switching message is illegal, the synchronous node 530 transmits an illegality message to the controller 500, herein the illegality message is used to indicate that the synchronous node 530 is abnormal, and the controller 500 learns that the synchronous node 530 is abnormal through the illegality message. Thus, the illegality message is used to hand over a right of control of the synchronous switching from the synchronous node 530 to the controller 500. In a subsequent step, switching of the synchronization link is performed by the controller 500, and more specific subsequent steps will be described in detail later in the embodiment six.

In the embodiment five of the present document, in the process of delivering a failure, the failure message is directly delivered to the controller through the failure message, and then it is handed over to the controller 500 for decision of link switching. In this way, an abnormal node or link in the network can be rapidly delivered to the controller, and thereby is rapidly switched by the controller, so as to avoid the disadvantage of delivering a failure in a hop-by-hop transmission manner in the existing technology. Herein, the failure delivery process is a process in which the synchronous node 510 transmits a failure message to the controller 500 when the synchronous node 510 has an alarm and the synchronous node 510 itself does not have an alternative input reference source. The disadvantage of delivering a failure in a hop-by-hop transmission manner lies in that in the hop-by-hop transmission process, a delay time needs to be maintained at each node and a total switching delay will increase with the number of hops. Thus, it will be difficult to guarantee the switching time to be within several hundred milliseconds (ms), thereby affecting the frequency synchronization performance and time synchronization performance.

In the embodiment five of the present document, a hop-by-hop transmission manner is also used during the link synchronization, and the delay time of each synchronous node may not be maintained in the hop-by-hop transmission process. That is, when a switching message is determined to be legal after receiving the switching message, the switching message is directly delivered to the next synchronous node. In a case that the total switching time is allowed, the delay time can also be maintained at each synchronous node. Whether to maintain the delay time may be judged by the controller according to the number of hops. If the number of hops is within a threshold range, it can be maintained. If it is not within the threshold range, no maintenance is performed. The reason why the hop-by-hop transmission manner is used in the process of link synchronization is that this can avoid an interlocking condition.

Embodiment Six

Figure 6:
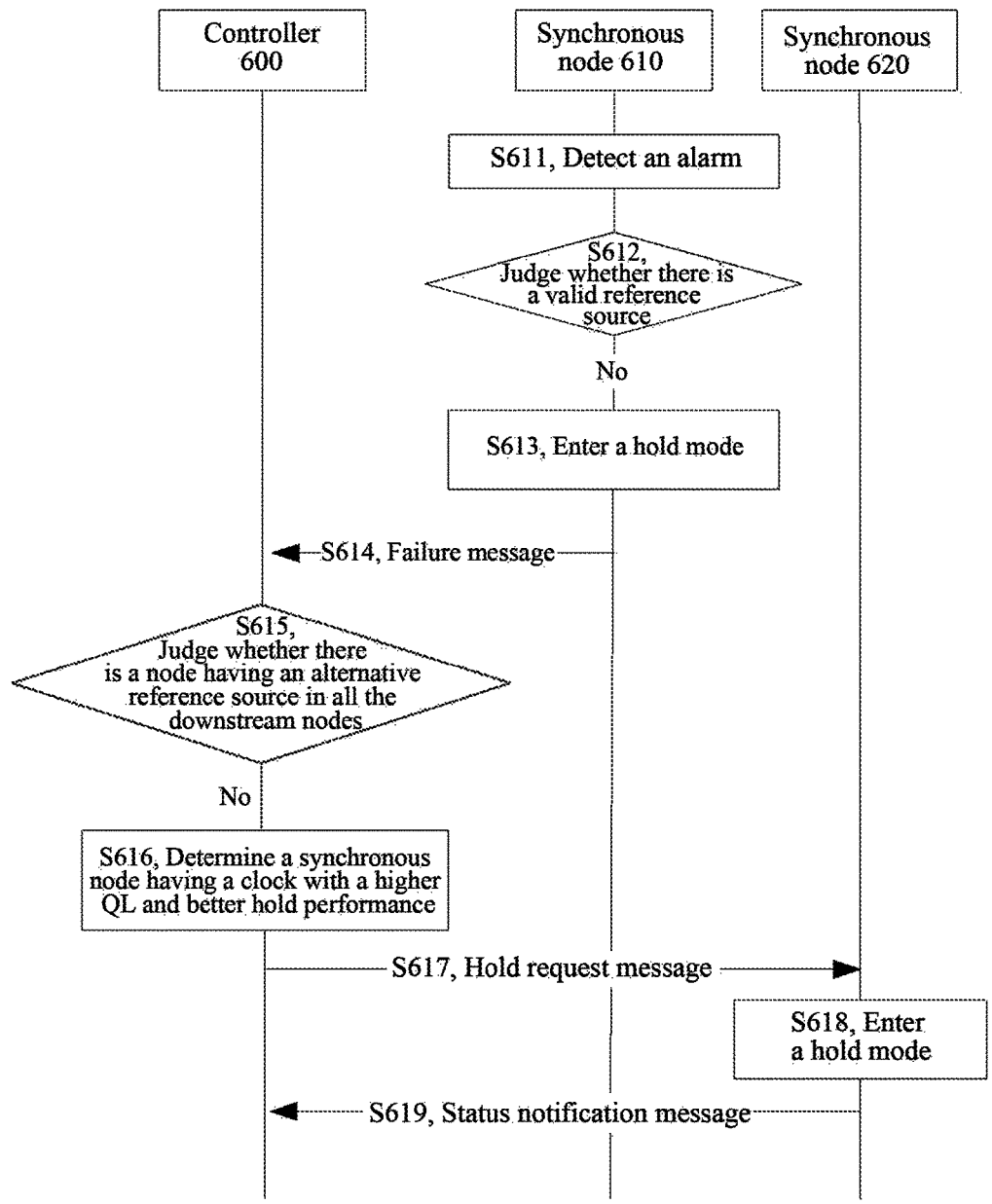
FIG. 6 is a timing diagram of a synchronization method according to embodiment six of the present document.

The embodiment six of the present document provides a synchronization method applied to a synchronous network. The synchronous network includes a controller 600 and a number of synchronous nodes controlled by the controller 600. After including steps S311-S315 illustrated in FIG. 3, the synchronization method in the embodiment six further includes the following steps as shown in FIG. 6.

In step S611, a synchronous node 610 detects an alarm.

Specifically, the synchronous node 610 controlled by the controller 600 detects failure of an input source, i.e., the synchronous node 610 detects an alarm.

In step S612, the synchronous node 610 judges whether there is a valid reference source; if there is no valid reference source, the process proceeds to step S613.

Specifically, the synchronous node 610 judges whether the synchronous node 610 itself has another valid input reference source according to the synchronization rule; if the synchronous node 610 itself has not other valid input reference source according to the synchronization rule, the process proceeds to step S613.

In step S613, the synchronous node 610 enters a hold mode.

Specifically, a phase locked loop in the synchronous node 610 enters a hold mode or a hold state when the synchronous node 610 judges that the synchronous node 610 itself does not have a valid input reference source.

In step S614, the synchronous node 610 transmits a failure message to the controller 600.

In step S615, the controller 600 judges whether there is a node having an alternative reference source in all the downstream nodes, and if there is no node having an alternative reference source in all the downstream nodes, the process proceeds to step S616.

Specifically, after receiving the failure message transmitted by the synchronous node 610, the controller 600 judges whether there is a node having an alternative reference source in all the downstream nodes of the synchronous node 610, and if there is no node having an alternative reference source in all the downstream nodes of the synchronous node 610, the process proceeds to step S616 (it is assumed that a node having an alternative reference source in the downstream nodes of the synchronous node 610 is synchronous node 620).

In step S616, the controller 600 determines a synchronous node having a clock with a higher QL and better hold performance.

Specifically, the controller 600 determines a synchronous node having a clock with a higher QL or better hold performance in all the downstream nodes of the synchronous node 610. It is assumed that the synchronous node having a clock (crystal oscillator) with a higher QL or better hold performance is node 620.

In step S617, the controller 600 transmits a hold request message to the synchronous node 620.

Here, the hold request message indicates that the synchronous node 620 enters a hold mode.

In step S618, the synchronous node 620 enters a hold mode.

In step S619, the synchronous node 620 transmits a status notification message to the controller 600.

Here, the status notification message transmitted by the synchronous node 620 to the controller is used to indicate that the synchronous node 620 has entered the hold mode.

In the embodiments four, five and six of the present document, the controllers 400, 500 and 600 are only represented with different reference numerals in different embodiments, and in fact the controllers 400, 500 and 600 refer to the same object. For example, the controllers 400, 500 and 600 may each refer to a controller in the same SDN; and the synchronous nodes 410, 510 and 610 also refer to the same synchronous node, i.e., a synchronous node having an alarm in the same SDN.

It should be noted that the synchronization method according to the above embodiment of the present document is applicable not only to a frequency synchronous network (SyncE and PTP), but also to a time synchronous network (PTP).

Embodiment Seven

The embodiment of the present document provides a synchronization method applied to a synchronous network. The method includes the following steps.

In step C1, after a controller and synchronous nodes in the synchronous network are powered on, all the synchronous nodes establish a Transmission Control Protocol (TCP)/Secure Sockets Layer (SSL) connection with the controller, and the controller acquires node information of the synchronous nodes.

Here, the node information includes Media Access Control (MAC) addresses, Internet Protocol (IP) addresses, device capability parameters, port configuration parameters etc., herein a port (P) is an input (I) port or an output (O) port of a node. In FIGS. 7-1 to 7-3 and 8-1 to 8-2, the input port is abbreviated as IN or I, and the output port is abbreviated as OUT or O.

In step C2, the controller detects a physical connection relationship of ports between all the synchronous nodes in the synchronous network by transmitting a Link Layer Discovery Protocol (LLDP) message, thus the controller acquires the physical link topology information of the synchronous network.

Figures 1, 7:
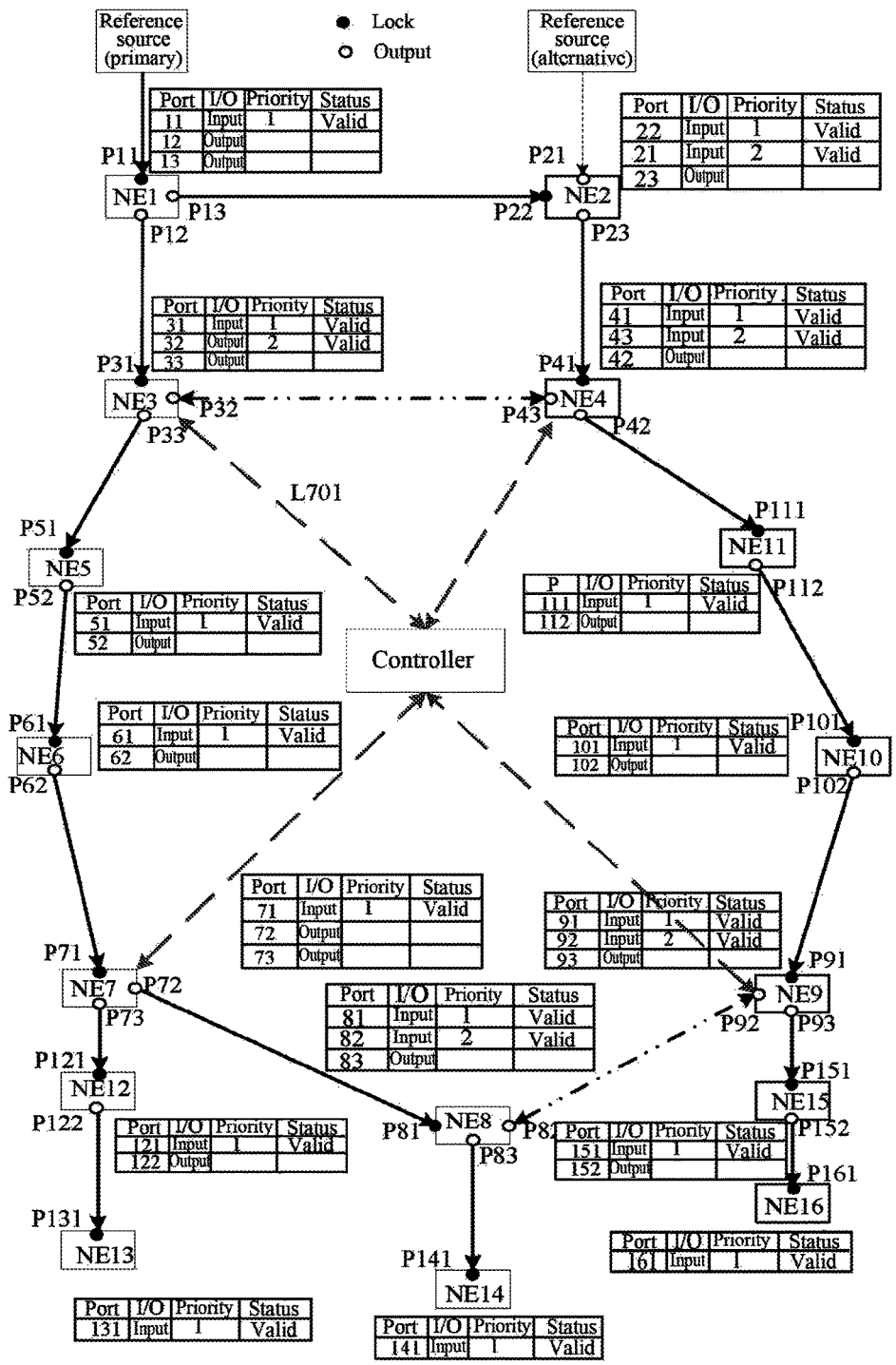
Figures 2, 7:
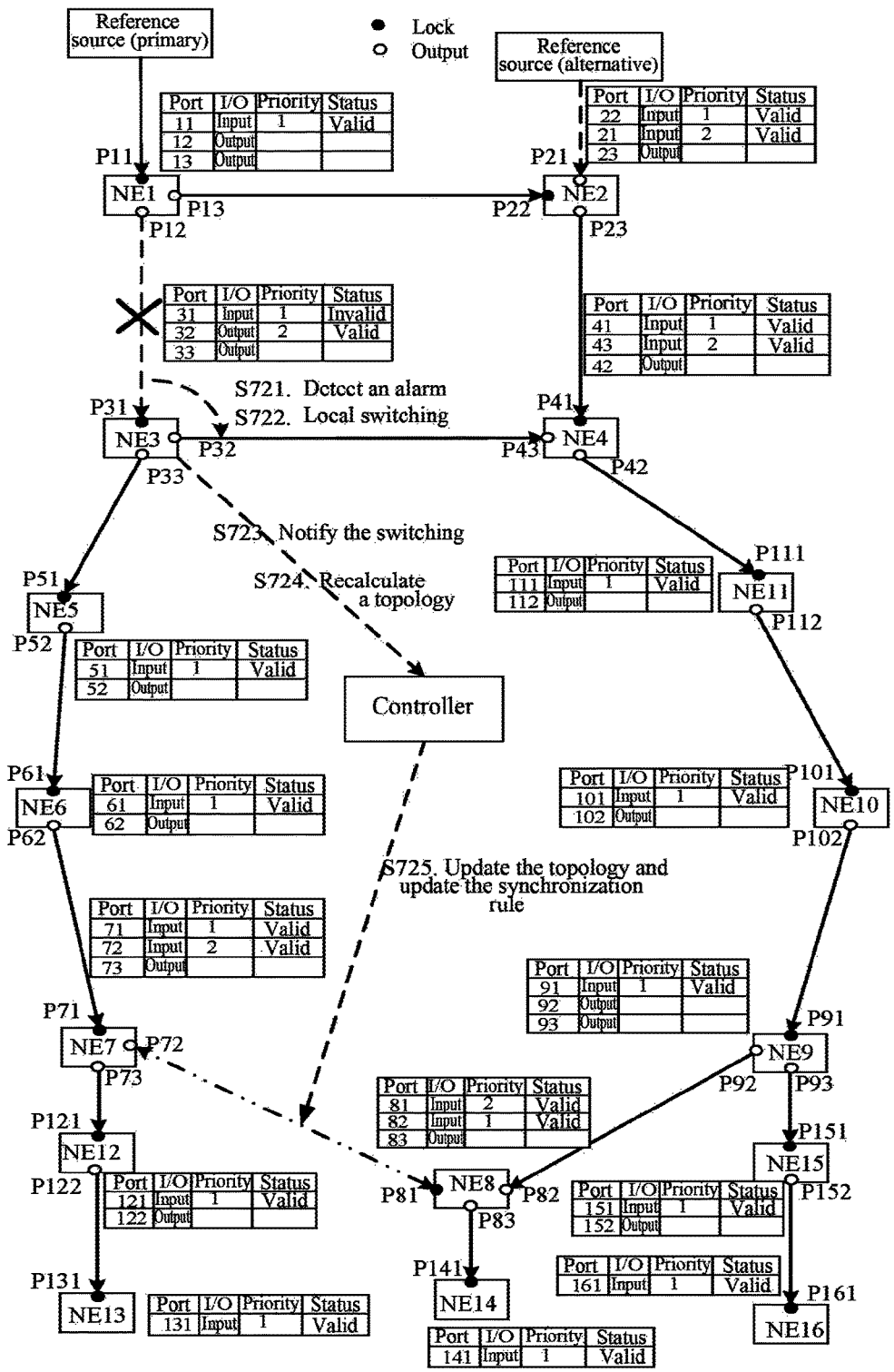
Figures 3, 7:
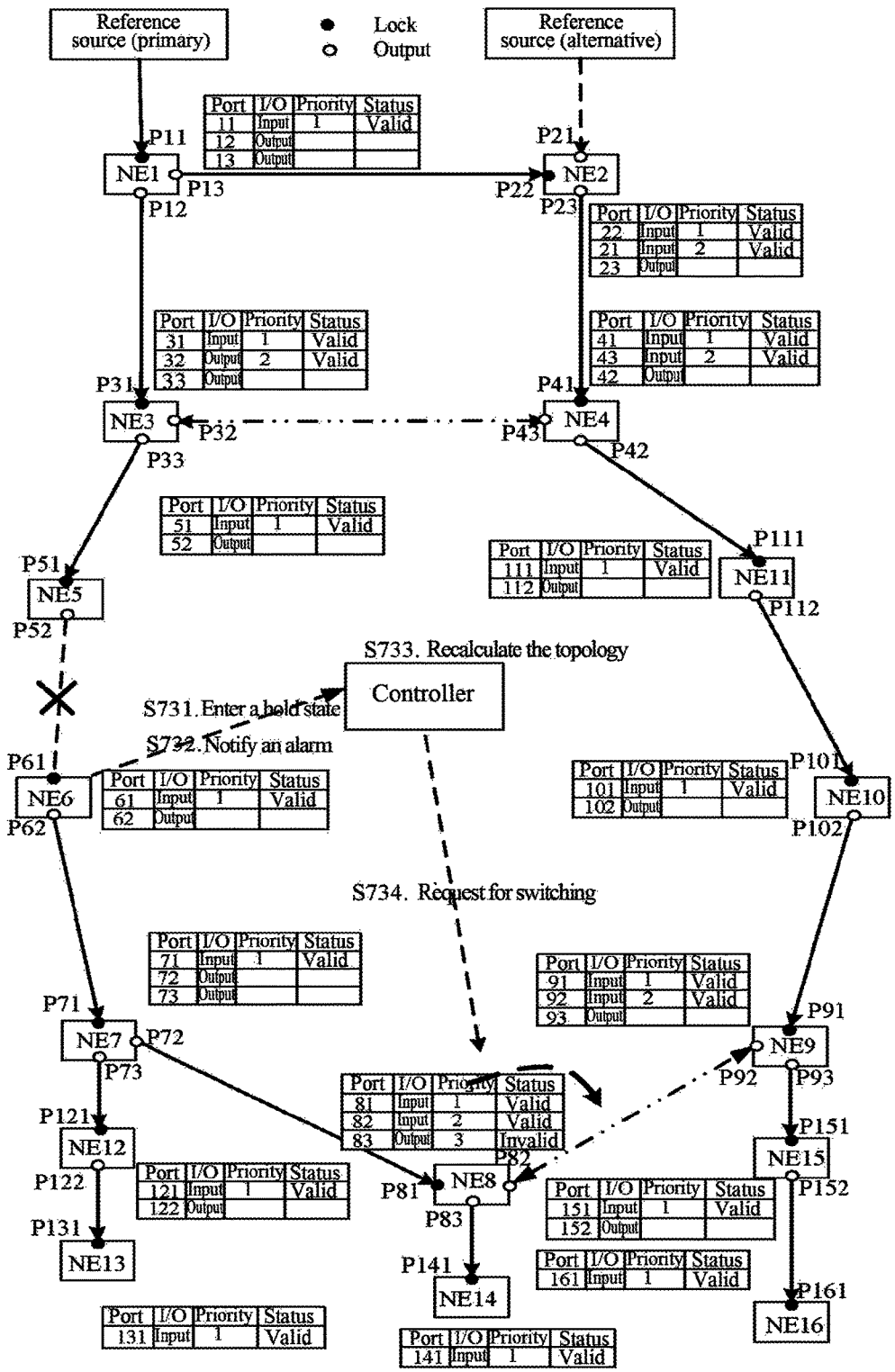

Here, with reference to FIG. 7-1, the controller detects that the physical link topological structure of the synchronous network as shown in FIG. 7-1 includes two ring links by transmitting an LLDP message, herein one ring link refers to a ring link formed by nodes NE1 to NE4, and the other ring link refers to a ring link formed by NE3 to NE11.

In step C3, the controller determines the synchronization link topology information based on information such as Quality Level (QL) information of a clock/time source, QL information of the synchronous nodes, local priority of a synchronous port and a hop number.

Here, the synchronization link topological structure represented by the synchronization link topology information is a topological structure without a ring link; and the physical link topological structure represented by the aforementioned physical link topology information is a topological structure including a ring link. In FIG. 7-1, a local priority of a synchronous port is abbreviated as a priority, and is represented by Arabic numeral 1, 2, 3, etc., herein the lower the priority number is, the higher the priority level is. That is, a level of 1 indicates the highest priority.

Here, still by taking FIG. 7-1 as an example, as shown in FIG. 7-1, the synchronization link topological structure determined by the controller is illustrated with solid black lines where an arrow direction of the black solid lines is a delivery direction of a reference source; and the black dotted lines are broken-ring points, that is, the link between node NE3 and node NE4 is the broken-ring points, and the link between node NE8 and node NE9 is the broken-ring points.

In step C4, the controller generates a synchronization rule for a synchronous node according to the physical link topology information and the synchronization link topology information, and issues the synchronization rule to the synchronous node.

Here, the synchronous node NE3 is taken as an example to illustrate that the controller issues the synchronization rule to the synchronous node. The synchronization rule issued by the controller to the NE3 is shown in FIG. 7-1. The ports (P) 31 and P32 of the NE3 are the input ports of the reference source, but the priority of the reference source of the P31 is higher than the priority of the reference source of P32. Here, it is still assumed that the lower the number, the higher the represented priority. Therefore, the node NE3 acquires the input reference source from the P31. At the same time, both the reference sources of the two input ports P31 and P32 of the node NE3 are valid, which indicates that there is no failure such as an alarm; and in addition, the P33 is an output port for outputting frequency and/or time information to the downstream.

In step C5, the controller issues a request message for establishing a synchronization link to various synchronous nodes to establish frequency and/or time synchronization links in the entire network. After each synchronous node receives the request message, the synchronous node locks a reference source with the highest priority according to the synchronization rule and transmits frequency and/or time information to other ports.

As shown in FIG. 7-1, after the controller determines the synchronization topological structure information, it transmits a request message for establishing a synchronization link to the synchronous node NE3 (see dashed line L701). After receiving the request message, the synchronous node NE3 locks an input port of a corresponding reference source according to the synchronization rule, that is, locks P31, and outputs frequency and/or time information to other ports, i.e., P33 and P32.

In step C6, after the synchronous node detects that the current input source fails, if there is another valid reference source in the synchronization rule, the synchronous node is switched to the best reference source according to the priority; and after the switching is performed, the synchronous node updates a local synchronization rule and transmits a switching completion message to notify the controller.

The controller updates the synchronization link topology information and the synchronization rule and establishes a new synchronization link.

Here, as shown in FIG. 7-2, by taking the NE3 node as an example, if the input source of the node NE3 is invalid, the node NE3 proceeds to a step of detecting an alarm illustrated in step S721.

Next, the node NE3 proceeds to a step of local switching illustrated in step S722, which includes: if the node NE3 judges that the node NE3 itself has another valid reference source according to the synchronization rule, then the node NE3 switching to P32 according to the synchronization rule.

Then, the node NE3 proceeds to a step of notifying the switching illustrated in step S723, which includes the node NE3 transmitting a switching completion message to notify the controller after the switching is performed.

The controller then proceeds to a step of recalculating a topology illustrated in step S724, which includes: after receiving the switching completion message, the controller determining the synchronization link topology information again; and regenerating a synchronization rule for the synchronous node.

Finally, the controller proceeds to a step of updating the topology and updating the synchronization rule illustrated in step S725, which includes: if the controller finds that the topology of the nodes NE7 and NE8 changes after recalculating the topological structure, updating the synchronization rule of NE7 and NE8, and establishing a new synchronization link, and the topological structure and synchronization rule of other nodes remain unchanged.

In step C7, after the synchronous node detects that the current input source fails, if there is no other valid reference source in the synchronization rule, the synchronous node enters a hold state, and then transmits a failure message to the controller, and the switching of the synchronization link is performed by the controller.

Here, also with reference to FIG. 7-3, by taking the node NE6 as an example, if an input reference source of the NE6 fails, the node NE6 firstly proceeds a step of entering a hold state illustrated in step S731, that is, if the NE6 checks that there is no other valid input reference source in the synchronization rule, the node NE6 enters a hold state.

Next, the node NE6 proceeds to a step of notifying an alarm illustrated in step S732, which includes: the node NE6 transmitting a failure message to notify the controller, and the controller performing processing of the synchronization link.

Then, the controller proceeds to a step of recalculating the topology illustrated in step S733, which includes: after receiving the failure message, the controller determining the synchronization link topology information again; and regenerating a synchronization rule of the synchronous node.

Finally, the controller proceeds to a step of requesting for switching illustrated in step S734, which includes: if the controller finds that the downstream node NE8 of the node NE6 has an alternative reference source after the controller recalculates the topological structure, the controller transmits a switching request message to the node NE8, the switching request message is used to indicate the node NE8 to switch to the node NE9 and indicate the NE8 to transmit a switching message to the upstream node NE7.

In the embodiment seven of the present document, the above switching process is a real-time switching process. On one hand, once the synchronous node finds that there is an alternative input reference source locally, it immediately implements local switching, and notifies the controller after the switching is performed, to update the topology and update the synchronization rule; and on the other hand, when the synchronous node finds that there is no alternative input reference source locally, it immediately transmits a failure message to notify the controller, and the controller performs switching of the synchronization link. Thus, in the present embodiment, no matter for the notification after the local switching is performed or for the failure notification, it is directly interacted with the controller, so as to ensure the real-time performance of the link synchronization.

Embodiment Eight

The present embodiment provides a synchronization method applied to a synchronous network. The synchronous network includes a controller and a number of synchronous nodes controlled by the controller. The method includes the following steps.

First 5 steps D1 to D5 of the present embodiment can be known correspondingly with reference to C1 to C5 in embodiment seven, and therefore will not be repeated.

In step D6, when the current input reference source of the synchronous node is invalid, it is checked whether there is another valid reference source in the synchronization rule; and if there is no other valid reference source in the synchronization rule, the synchronous node firstly enters a hold state and updates the synchronization rule, and then transmits a failure message to the controller, and the controller performs processing of the synchronization link.

Figures 1, 8:
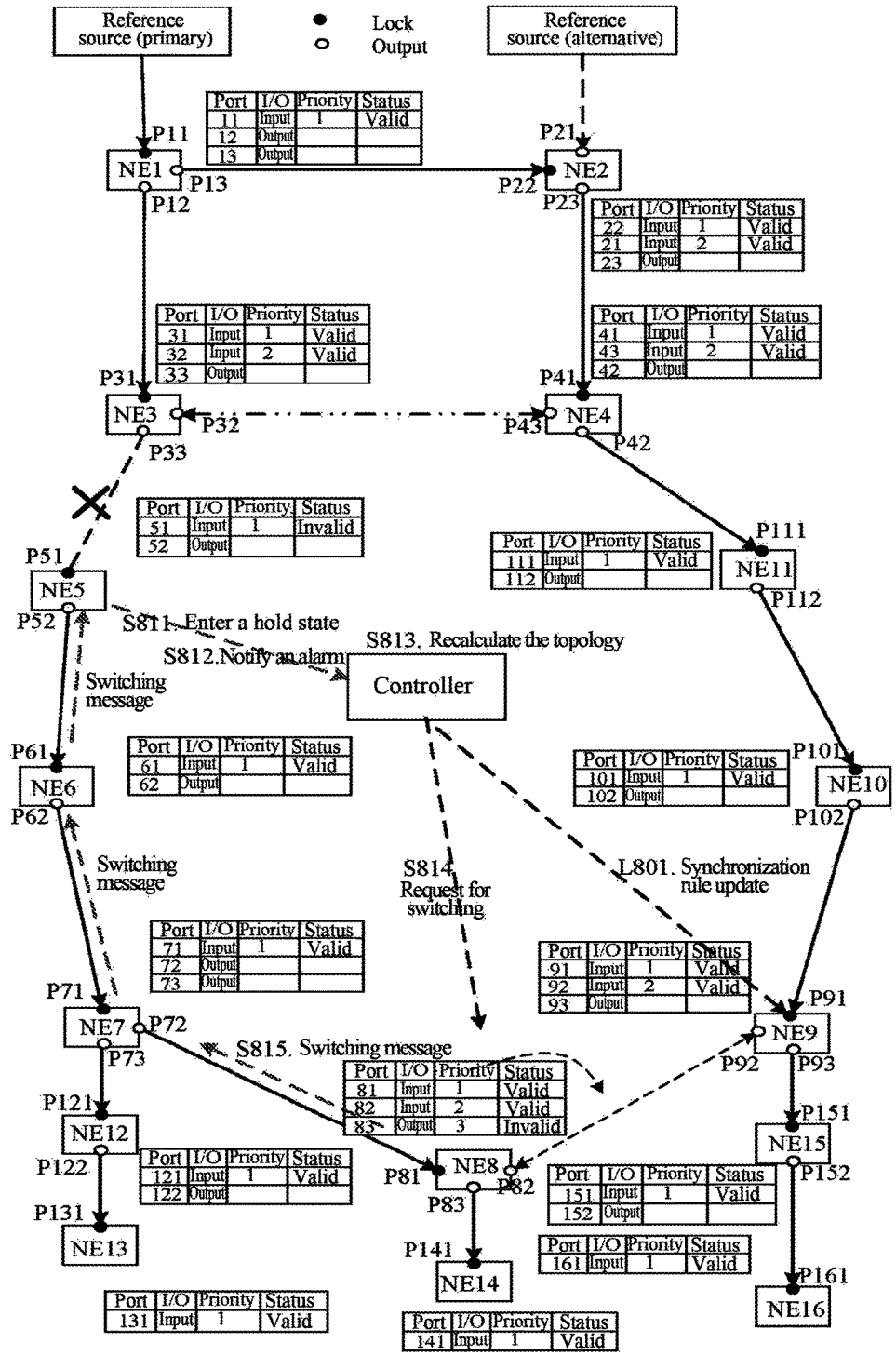
Figures 2, 8:
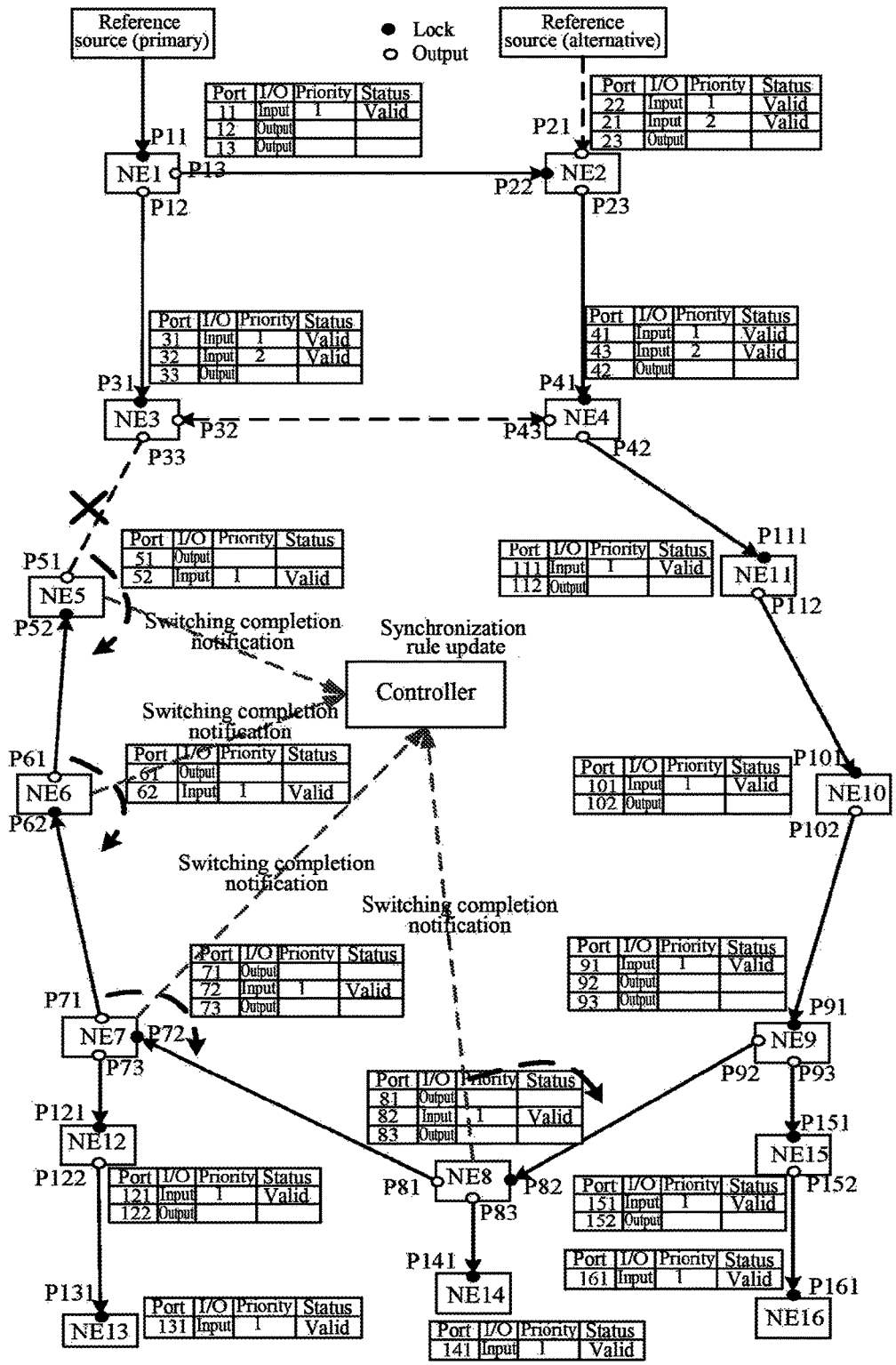
Figures 3, 8:
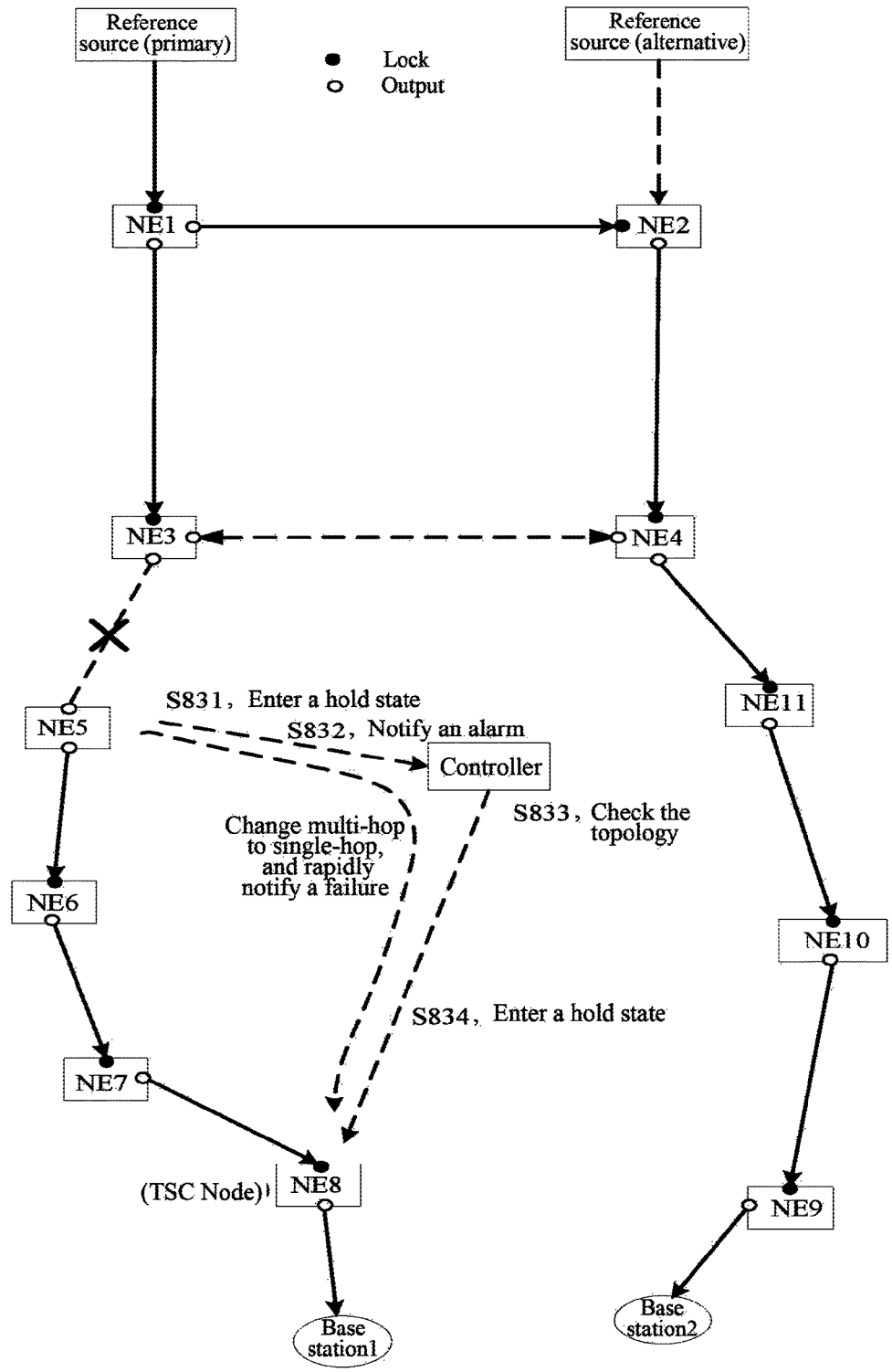

Here, with reference to FIG. 8-1, if the current input reference source of the node NE5 fails, the node NE5 proceeds to a step of entering a hold state illustrated in step S811, which includes: if the node NE5 finds that there is no other available input reference source in the synchronization rule through checking, the NE5 entering the hold state and updating the synchronization rule.

Then, the node NE5 proceeds to a step of notifying an alarm illustrated in step S812, which includes: the node NE5 notifying the controller through a failure message, and the controller performing processing of the synchronization link.

In step D7, if the controller receives the failure message, it checks whether there is an alternative input reference source of all the downstream nodes of the synchronous node; and if there is an alternative input reference source of all the downstream nodes of the synchronous node, the process proceeds to step D81; otherwise, the process proceeds to step D82.

In D81, the controller transmits a switching request message to a node having the alternative input reference source, and then the process proceeds to step D9.

Herein, the switching request message is used to request the node having the alternative input reference source to switch to the alternative reference source and to request the node having the alternative input reference source to transmit a switching message to an upstream node.

Here, continuing with the example in step D6, with reference to FIG. 8-1, the controller proceeds to a step of recalculating the topology illustrated in step S813, which includes:

the controller receiving the failure message of the node NE5, firstly updating the synchronization rule of the node NE5, checking whether there is a node having an alternative input reference source in all the downstream nodes of the node NE5, and finding that the downstream node NE8 has an alternative input reference source through checking.

Then, the controller proceeds to a step of requesting for switching illustrated in step S814, which includes: the controller transmitting a switching request message to the node NE8, herein the switching request message is used to request the synchronous node NE8 to switch to the alternative reference source and is used to request the synchronous node NE8 to transmit a switching message to the upstream node NE7 to notify the synchronous node NE7 to perform switching of the synchronization link.

In addition, in step D71, the controller further needs to notify the node having a changed topology to update the synchronization rule, which, with reference to step L801 of FIG. 8-1 here, includes: the controller finding that the synchronization rule of the node NE9 is required to be updated after recalculating the topology, and transmitting a request message to the node NE8, herein the request message carries the synchronization rule of NE9.

In step D82, the controller determines a node having a clock with a higher quality level or better maintenance performance in the downstream nodes of the synchronous node, and then the controller transmits a hold request message to the node having a clock with a higher quality level or better maintenance performance, to request the node having a clock of a higher quality level or better maintenance performance to enter a hold mode.

Here, with reference to FIG. 8-3, steps S831 and S832 in FIG. 8-3 are respectively the same as steps S811 and S812 in FIG. 8-1, and therefore will not be repeated. In FIG. 8-3, after the node NE5 fails, the controller detects that there is no alternative input reference source for the downstream nodes of the node NE5, but the downstream node NE8 of the node NE5 has a clock with better hold performance, i.e., a TSC node. Then, the controller transmits a hold request message to the node NE8, to request the node NE8 to enter a hold mode, so that the NE8 can enter the hold state as soon as possible, thereby improving the synchronization performance of the base station.

In step D9, the node having the alternative input reference source transmits a switching message to the upstream node, and the process proceeds to step D10.

Here, continuing with the example in step D81, with reference to FIG. 8-1, the synchronous node NE8 transmits a switching message to the upstream node NE7.

In step D10, if the upstream node receives the switching message transmitted by the node having the alternative input reference source, the upstream node calculates port information according to the synchronization rule and verifies the legitimacy of an entrance of the switching message; and if it is legal, the upstream node performs switching of the reference source according to the synchronization rule, and transmits a message to notify the controller after the switching is performed.

Here, the step D9 is followed by the step D10.

Here, continuing with the example in step D9, with reference to FIG. 8-1, the upstream node NE7 receives the switching message transmitted by the synchronous node NE8, and the upstream node NE7 performs checking according to the synchronization rule based on the input port information of the switching message; and if it is found that the switching message is received from the downstream port (P72), it is judged that the switching message is legal.

Then, the node NE7 switches to the downstream port P72, and updates the synchronization rule.

Then, the node NE7 transmits a switching completion message to notify the controller, and the controller updates the synchronization rule of the node NE7 to ensure the consistency of the synchronization rule. In addition, if the node NE7 checks that the synchronization rule has a valid input reference source (corresponding to port 71), the node NE7 forwards the switching message to the port 71.

Here, the switching message may be forwarded after a delay time, that is, the switching message may be forwarded by the NE7 to the upstream node NE6 after holding the delay time.

In step D11, after a second upstream node of the node having the alternative input reference source receives the switching message transmitted by the first upstream node of the node having the alternative input reference source, the second upstream node verifies the legitimacy and forwards the switching message.

Here, step D10 is followed by step D11. Continuing with the example in step D10, with reference to FIGS. 8-1 and 8-2, after the node NE6 receives the switching message transmitted by the downstream node NE7, the processing process of the NE6 is similar to a processing process in which the node NE7 receives the switching message transmitted by the node NE8, and therefore will not repeated here. Finally, the switching message arrives at the failed node NE5. After the failed node NE5 completes the switching, it transmits a switching completion message to notify the controller, and after the node NE5 finds that the original reference source, i.e., the primary reference source, is invalid, the node NE5 no longer forwards the switching message.

Embodiment Nine

Figures 1, 9:
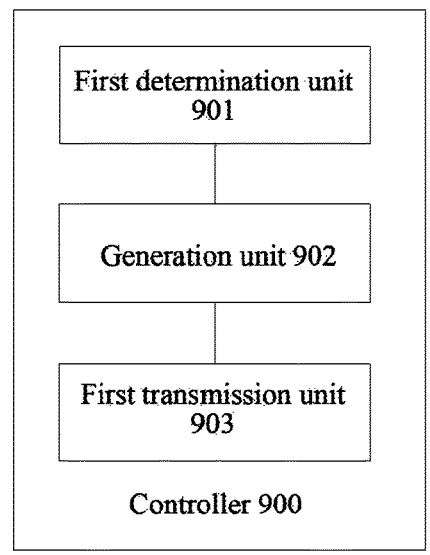
Figures 2, 9:
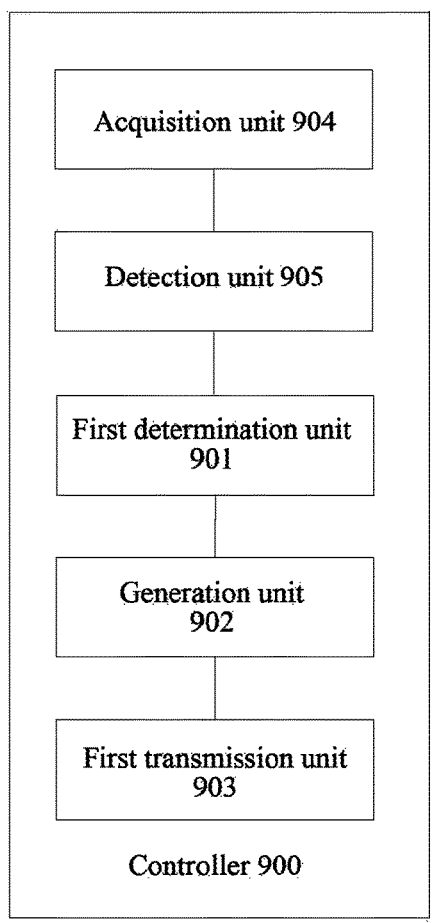
Figures 3, 9:
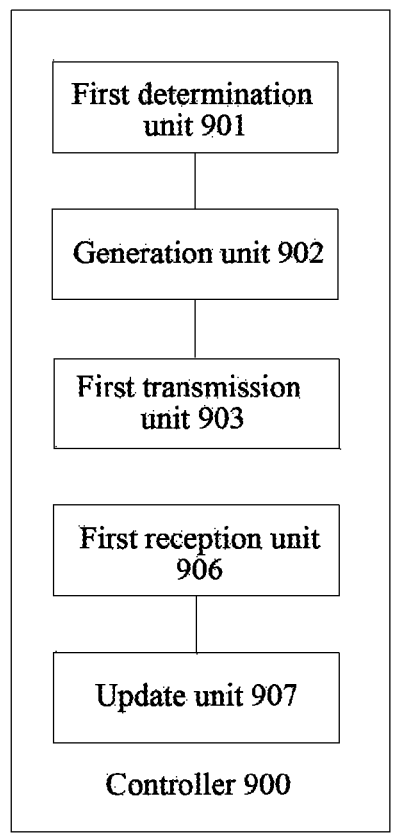

The embodiment of the present document provides a controller. FIG. 9-1 is a first constitutional structural diagram of the controller according to the embodiment nine of the present document. As shown in FIG. 9-1, the controller 900 includes a first determination unit 901, a generation unit 902 and a first transmission unit 903, herein the first determination unit 901 is arranged to determine synchronization link topology information of a synchronous network according to physical link topology information of the synchronous network and synchronization information of a synchronous node in the synchronous network;

the generation unit 902 is arranged to generate a synchronization rule of the synchronous node according to the synchronization link topology information; and the first transmission unit 903 is arranged to transmit the synchronization rule and/or a request message to the synchronous node in the synchronous network according to the synchronization link topology information.

Here, for the first transmission unit 903, when the first transmission unit is arranged to transmit a request message to the synchronous node in the synchronous network according to the synchronization link topology information, the synchronization rule is carried in the request message.

Based on the embodiment illustrated in FIG. 9-1, as shown in FIG. 9-2, the controller 900 according to the embodiment of the present document further includes an acquisition unit 904 and a detection unit 905, herein the acquisition unit 904 is arranged to acquire the synchronization information of the synchronous node in the synchronous network; and the detection unit 905 is arranged to detect a physical connection relationship of ports between synchronous nodes to acquire the physical link topology information.

Based on the embodiment illustrated in FIG. 9-1, as shown in FIG. 9-3, the controller 900 according to the embodiment of the present document further includes a first reception unit 906 and an update unit 907, herein the first reception unit 906 is arranged to receive a switching completion message transmitted by the synchronous node and trigger the update unit; and the update unit 907 is arranged to update the synchronization link topology information and/or the synchronization rule.

In the embodiment of the present document, when the update unit is arranged to update the synchronization link topology information and the synchronization rule, the update unit 907 is further arranged to update the synchronization link topology information according to the physical link topology information of the synchronous network and the synchronization information of the synchronous node in the synchronous network; and update the synchronization rule according to the synchronization link topology information.

In the embodiment of the present document, when the update unit is arranged to update the synchronization link topology information and the synchronization rule, identity information of the best reference source is carried in the switching completion message; and correspondingly, the update unit 907 is further arranged to update the synchronization link topology information and the synchronization rule according to the identity information of the best reference source.

The first transmission unit 906 is further arranged to determine a synchronous node required to be resynchronized according to the updated synchronization link topology information; and carry the updated synchronization link topological structure information and synchronization rule in an established request message to transmit to the synchronous node required to be resynchronized.

In the embodiment of the present document, the controller further includes a first judgment unit, herein the first reception unit is further arranged to receive a failure message which is used to indicate that there is no other valid reference source transmitted by the synchronous node, and trigger the first judgment unit;

the first judgment unit is arranged to judge whether there is an alternative reference source for all the downstream nodes of the synchronous node, and if there is an alternative reference source for all the downstream nodes of the synchronous node, trigger the first transmission unit; and the first transmission unit is arranged to transmit a switching request message which is used to indicate switching to the alternative reference source to a downstream node having the alternative reference source.

In the embodiment of the present document, the first determination unit is further arranged to, when judging that there is no alternative reference source for all the downstream nodes of the synchronous node, determine a first downstream node having a clock with a higher quality level or better hold performance from the downstream nodes of the synchronous node, and trigger the first transmission unit; and the first transmission unit is arranged to transmit a hold request message to the first downstream node to request the first downstream node to enter a hold mode.

Embodiment Ten

Figures 1, 10:
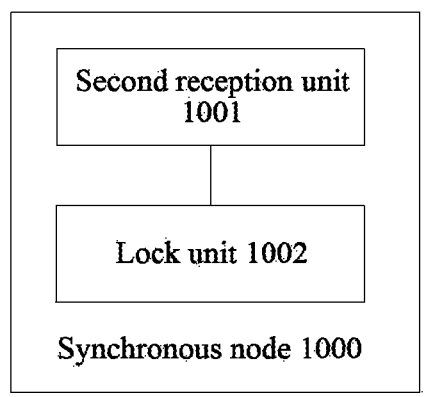
Figures 2, 10:
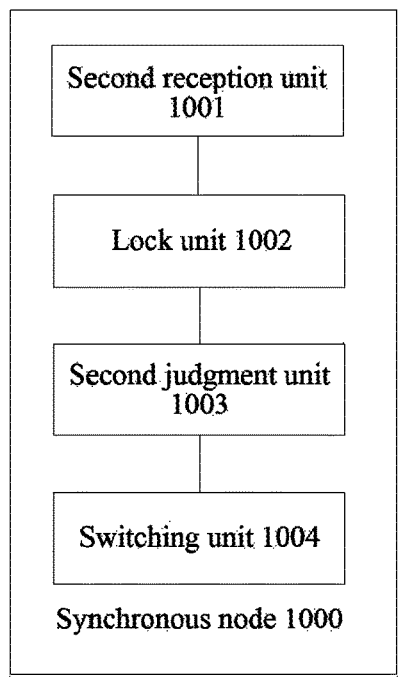
Figures 3, 10:
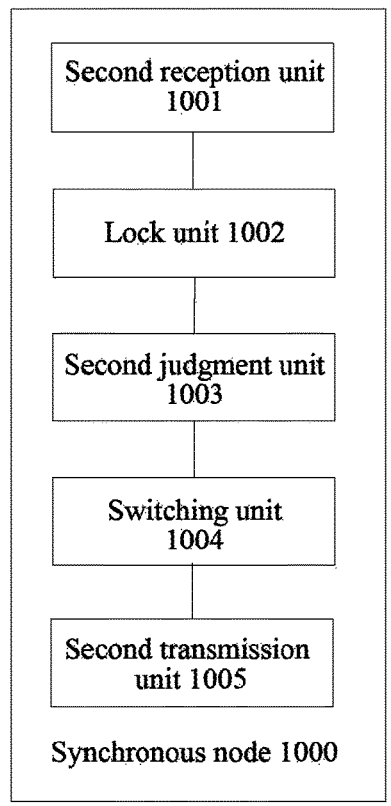

The embodiment of the present document provides a synchronous node. FIG. 10-1 is a first constitutional structural diagram of the synchronous node according to the embodiment ten of the present document. As shown in FIG. 10-1, the synchronous node 1000 includes a second reception unit 1001 and a lock unit 1002, herein the second reception unit 1001 is arranged to receive a synchronization rule and/or a request message transmitted by a controller in the synchronous network; and the lock unit 1002 is arranged to lock the best valid reference source according to the synchronization rule, and output information of the reference source to another port.

Based on the embodiment illustrated in FIG. 10-1, as shown in FIG. 10-2, the synchronous node further includes a second judgment unit 1003 and a switching unit 1004, herein the second judgment unit 1003 is arranged to judge whether an input reference source has an alarm, if then input reference source has an alarm, continue to judge whether there is another valid reference source according to the synchronization rule, and if there is another valid reference source according to the synchronization rule, trigger the switching unit; and the switching unit 1004 is arranged to switch to the best reference source according to the synchronization rule.

Based on the embodiment illustrated in FIG. 10-2, as shown in FIG. 10-3, the synchronous node 1000 further includes a second transmission unit 1005 arranged to update a local synchronization rule and transmit a switching completion message to the controller.

In the embodiment of the present document, the second reception unit is further arranged to receive a request message transmitted by the controller and trigger the lock unit, herein an updated synchronization link topology information and synchronization rule is carried in the request message; and the lock unit is arranged to lock the best valid reference source according to the synchronization rule, and output information of the reference source to another port.

In the embodiment of the present document, the synchronous node further includes a hold unit, herein the second judgment unit is arranged to trigger the hold unit when determining that there is no other valid reference source according to the synchronization rule;

the hold unit is arranged to enable the synchronous node to enter a hold mode and trigger the second transmission unit; and the second transmission unit is arranged to transmit a failure message which is used to indicate that there is no other valid reference source to the controller.

In the embodiment of the present document, the second reception unit is arranged to receive a switching request message which is used to indicate switching to the alternative reference source transmitted by the controller and trigger the switching unit;

the switching unit is arranged to switch to an alternative reference source and trigger the second transmission unit; and the second transmission unit is arranged to transmit a switching message which is used to indicate switching to a first upstream synchronous node of the synchronous node.

In the embodiment of the present document, the second reception unit is arranged to receive the switching message and trigger the second judgment unit;

the second judgment unit is arranged to judge whether an input port which receives the switching message is legal according to the synchronization rule and if the input port which receives the switching message is legal, trigger the switching unit;

the switching unit is arranged to switch the reference source according to the synchronization rule and trigger the second transmission unit; and the second transmission unit is arranged to transmit a switching completion message to the controller.

Embodiment Eleven

Figures 1, 11:
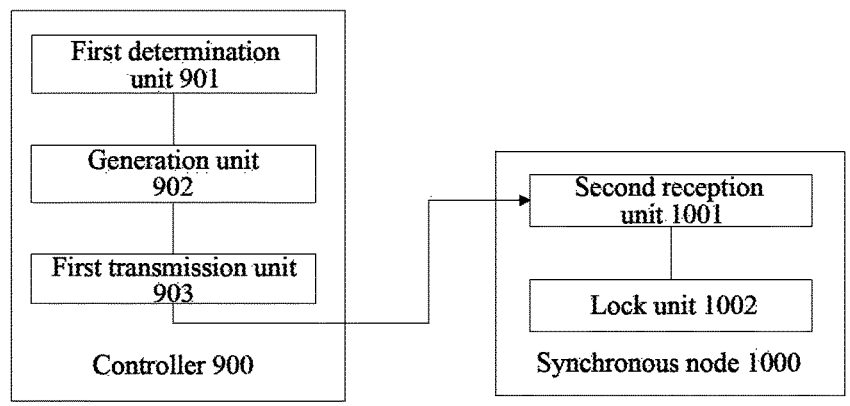
Figures 2, 11:
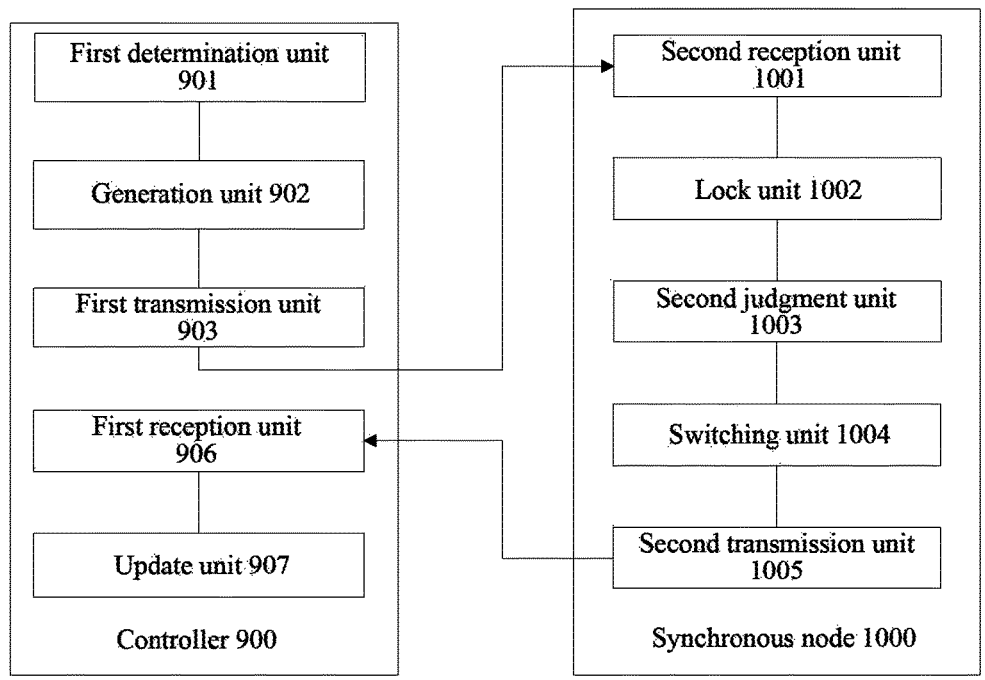

The embodiment of the present document provides a synchronous network. FIG. 11-1 is a first constitutional structural diagram of the synchronous network according to the embodiment eleven of the present document. As shown in FIG. 11-1, the synchronous network includes a controller 900 and a synchronous node 1000, herein the controller 900 includes a first determination unit 901, a generation unit 902 and a first transmission unit 903, and the synchronous node 1000 includes a second reception unit 1001 and a lock unit 1002, herein the first determination unit 901 is arranged to determine synchronization link topology information of the synchronous network according to physical link topology information of the synchronous network and synchronization information of a synchronous node in the synchronous network;

the generation unit 902 is arranged to generate a synchronization rule of the synchronous node according to the synchronization link topology information;

the first transmission unit 903 is arranged to transmit the synchronization rule and/or a request message to the second reception unit in the synchronous network according to the synchronization link topology information;

the second reception unit 1001 is arranged to receive the synchronization rule and/or the request message transmitted by the first transmission unit; and the lock unit 1002 is arranged to lock the best valid reference source according to the synchronization rule, and output information of the reference source to another port.

Based on the embodiment illustrated in FIG. 11-1, as shown in FIG. 11-2, in the synchronous network according to the present embodiment, the controller 900 further includes a first reception unit 906 and an update unit 907, and the synchronous node further includes a second judgment unit 1003, a switching unit 1004 and a second transmission unit 1005, herein, the second judgment unit 1003 is arranged to judge whether an input reference source has an alarm, if the input reference source has an alarm, continue to judge whether there is another valid reference source according to the synchronization rule, and if there is another valid reference source according to the synchronization rule, trigger the switching unit;

the switching unit 1004 is arranged to switch to the best reference source according to the synchronization rule;

the second transmission unit 1005 is arranged to update a local synchronization rule and transmit a switching completion message to the first reception unit 906;

the first reception unit 906 is arranged to receive the switching completion message transmitted by the second transmission unit 1005 and trigger the update unit 907; and the update unit 907 is arranged to update the synchronization link topology information and the synchronization rule;

The first determination unit, the generation unit, the first transmission unit, the acquisition unit, the detection unit, the first reception unit and the update unit etc. in the controller according to the embodiments of the present document can be realized by a processor in the controller. The second reception unit, the lock unit, the second judgment unit, the switching unit, the second transmission unit, and the hold unit etc. in the synchronous node according to the embodiments of the present document can be implemented by a processor in the synchronous node. Of course, the functions of the processor can also be implemented by a specific logic circuit. In a specific process of the embodiments, the processor may be a Central Processing Unit (CPU), a Microprocessor (MPU), a Digital Signal Processor (DSP), or a Field Programmable Gate Array (FPGA) etc., and the above communication terminal may be a device such as a mobile phone, a tablet computer etc.

It should be illustrated that in the embodiments of the present document, the synchronization method applied in the controller and/or the synchronization method applied in the synchronous node can also be stored in a computer-readable storage medium if they are implemented in a form of software function modules and are sold or used as stand-alone products. Based on such understanding, the essence of the technical solutions according to the embodiments of the present document or a part thereof which contributes to the existing technology can be embodied in a form of software products. The computer software products are stored in a storage medium including a number of instructions for causing a computer device (which may be a personal computer, a server, or a network device etc.) to perform all or a part of the methods described in the various embodiments of the present document. The storage media described above includes various media which can store program codes, such as a USB disk, a removable hard disk, a Read-Only Memory (ROM), a magnetic disk or an optical disk etc. Thus, embodiments of the present document are not limited to any particular combination of hardware and software.

Accordingly, the embodiments of the present document further provide a computer storage medium having stored therein computer executable instructions for performing the synchronization method applied in the controller and/or the synchronization method applied in the synchronous node according to the embodiments of the present document.

The controller, the synchronous node and the synchronous network according to the embodiments of the present document are merely illustrative. For example, the division of the units is only one logical function division. In a practical implementation, there may be an additional division manner, for example, many units or components may be combined, or may be integrated into another system, or some features may be omitted or may not be performed. In addition, the coupling, or direct coupling, or communication connection between various components shown or discussed may be indirect coupling or communication connection via some interfaces, devices, or units, which may be electrical or otherwise. The controller, the synchronous node and the synchronous network according to the embodiments of the present document are merely illustrative, and some more specific details thereof can be known with reference to the synchronization method according to the embodiments described above.

The units described above may or may not be physically separated. They may be located in one place or distributed over a plurality of network devices. For example, the controller and the synchronous node in the embodiments of the present document may be located on the same network entity device. Since the controller is a logical concept, it may be located on the same network entity device as the synchronous node. Alternatively, the controller and the synchronous node may also be located on two network entity devices respectively. Those skilled in the art may select some or all of the units in accordance with practical requirements to achieve the purpose of the solutions of the embodiments.

In addition, various functional units in various embodiments of the present document may be all integrated in one processing unit, or each unit may be separately provided as one unit, or two or more units may be integrated in one unit; and the above-mentioned integrated unit can be implemented in a form of hardware, or can also be implemented in a form of hardware and software functional units.

A person having ordinary skill in the art can understand that all or part of the steps for achieving the aforementioned method embodiments can be implemented by a program instructing related hardware, and the program can be stored in a computer readable storage medium, and when the program is executed, the steps of the method embodiments are performed. The storage medium described above includes various media which can store program codes, such as a removable storage device, a Read-Only Memory (ROM), a Random Access Memory (RAM), a magnetic disk or an optical disk etc.

Alternatively, the integrated modules described in the present document can also be stored in a computer-readable storage medium if they are implemented in a form of software function modules and are sold or used as stand-alone products. Based on such understanding, the essence of the technical solutions according to the embodiments of the present document or a part thereof which contributes to the existing technology can be embodied in a form of software products. The computer software products are stored in a storage medium including a number of instructions for causing a computer device (which may be a personal computer, a server, or a network device etc.) to perform all or a part of the methods described in the various embodiments of the present document. The storage media described above includes various media which can store program codes, such as a removable storage device, a ROM, a RAM, a magnetic disk or an optical disk etc.

The above description is only the specific embodiments of the present document, and the protection scope of the present document is not limited to the above description. Any skilled in the art can easily conceive changes or substitutions within the technique scope disclosed in the present document, which should be covered within the protection scope of the present document. Therefore, the protection scope of the present document should be based on the protection scope described in the claims.

INDUSTRIAL APPLICABILITY

In the embodiments of the present document, a controller in a synchronous network determines synchronization link topology information according to physical link topology information of the synchronous network and synchronization information of a synchronous node in the synchronous network; the controller generates a synchronization rule of the synchronous node according to the synchronization link topology information; and the controller transmits the synchronization rule and/or a request message to the synchronous node in the synchronous network according to the synchronization link topology information. Thus, switching of the synchronization link can be rapidly performed, so as to satisfy the real-time performance of the switching of the synchronization link, thereby effectively improving the synchronization performance of the entire network.

What is claimed is:
1. A synchronization method, comprising:
   a controller acquiring synchronization information of a synchronous node in a synchronous network;
   the controller detecting a physical connection relationship of ports between synchronous nodes to acquire physical link topology information;
   the controller determining synchronization link topology information of the synchronous network according to the physical link topology information of the synchronous network and the synchronization information of the synchronous node in the synchronous network;
   the controller generating a synchronization rule of the synchronous node according to the synchronization link topology information; and
   the controller transmitting the synchronization rule and/or a request message to the synchronous node in the synchronous network according to the synchronization link topology information;
   after transmitting the synchronization rule and/or a request message to the synchronous node in the synchronous network, the method further comprises:

the controller updating the synchronization link topology information and/or the synchronization rule after receiving a switching completion message transmitted by the synchronous node.

2. The method according to claim 1, wherein when the controller transmits a request message to the synchronous node in the synchronous network according to the synchronization link topology information, the synchronization rule is carried in the request message.

3. The method according to claim 1, wherein the method further comprises:

the controller receiving a failure message transmitted by the synchronous node; and the controller judging whether there is an alternative reference source for all downstream nodes of the synchronous node, and if there is an alternative reference source for all downstream nodes of the synchronous node, transmitting a switching request message to a downstream node having the alternative reference source, or, wherein the method further comprises: when judging that there is no alternative reference source for all downstream nodes of the synchronous node, the controller determining a first downstream node having a clock with a higher quality level or better hold performance from the downstream nodes of the synchronous node; and the controller transmitting a hold request message to the first downstream node to request the first downstream node to enter a hold mode.

4. The method according to claim 1, wherein the method further comprises:

the controller determining a synchronous node required to be resynchronized according to the updated synchronization link topology information; and the controller carrying the updated synchronization rule in an established request message to transmit to the synchronous node required to be resynchronized.

5. The method according to claim 1, wherein updating the synchronization link topology information and the synchronization rule comprises:

the controller updating the synchronization link topology information according to the physical link topology information of the synchronous network and the synchronization information of the synchronous node in the synchronous network; and the controller updating the synchronization rule according to the synchronization link topology information, or, wherein identity information of a best reference source is carried in the switching completion message; and correspondingly, updating the synchronization link topology information and the synchronization rule comprises:

the controller updating the synchronization link topology information and the synchronization rule according to the identity information of the best reference source.

6. A non-transitory computer storage medium, in which computer executable instructions are stored, wherein the computer executable instructions are used for performing the synchronization method according to claim 1, and/or the computer executable instructions are used for performing a synchronization method comprising:

a synchronous node receiving a synchronization rule and/or a request message carrying the synchronization rule transmitted by a controller; and the synchronous node locking a best valid reference source according to the synchronization rule, and outputting information of the reference source to another port.

7. A synchronous node comprising a second reception unit and a lock unit, wherein the second reception unit is arranged to receive a synchronization rule and/or a request message carrying the synchronization rule transmitted by a controller; and the lock unit is arranged to lock a best valid reference source according to the synchronization rule, and output information of the reference source to another port;

wherein the synchronous node further comprises a second judgment unit and a switching unit, wherein the second judgment unit is arranged to judge whether an input reference source has an alarm, if the input reference source has an alarm, continue to judge whether there is another valid reference source according to the synchronization rule, and if there is another valid reference source according to the synchronization rule, trigger the switching unit; and the switching unit is arranged to switch to the best reference source according to the synchronization rule, and, the synchronous node further comprises a second transmission unit arranged to update a local synchronization rule and transmit a switching completion message to the controller.

8. The synchronous node according to claim 7, wherein the synchronous node further comprises a hold unit, wherein the second judgment unit is arranged to trigger the hold unit when determining that there is no other valid reference source according to the synchronization rule;

the hold unit is arranged to enable the synchronous node to enter a hold mode and trigger the second transmission unit; and the second transmission unit is arranged to transmit a failure message to the controller.

9. The synchronous node according to claim 7, wherein the second reception unit is further arranged to receive a request message transmitted by the controller and trigger the lock unit, wherein an updated synchronization rule is carried in the request message; and the lock unit is arranged to lock the best valid reference source according to the synchronization rule, and output information of the reference source to another port, and, wherein the second reception unit is arranged to receive a switching request message transmitted by the controller and trigger the switching unit;

the switching unit is arranged to switch to an alternative reference source and trigger the second transmission unit; and the second transmission unit is arranged to transmit a switching message to a first upstream synchronous node of the synchronous node, and, wherein the second reception unit is arranged to receive the switching message and trigger the second judgment unit;

the second judgment unit is arranged to judge whether an input port which receives the switching message is legal according to the synchronization rule, and if the input port which receives the switching message is legal, trigger the switching unit;

the switching unit is arranged to perform reference source switching according to the synchronization rule and trigger the second transmission unit; and the second transmission unit is arranged to transmit a switching completion message to the controller.

10. A synchronization method, comprising:

a synchronous node receiving a synchronization rule and/or a request message carrying the synchronization rule transmitted by a controller; and the synchronous node locking a best valid reference source according to the synchronization rule, and outputting information of the reference source to another port;

wherein the method further comprises:

the synchronous node judging whether an input reference source has an alarm, and if the input reference source has an alarm, continuing to judge whether there is another valid reference source according to the synchronization rule; and when determining that there is another valid reference source according to the synchronization rule, the synchronous node switching to the best reference source according to the synchronization rule, and, wherein, when switching to the best reference source according to the synchronization rule, the method further comprises:

the synchronous node updating a local synchronization rule and transmitting a switching completion message to the controller.

11. The method according to claim 10, wherein the method further comprises:

the synchronous node receiving a request message transmitted by the controller, wherein an updated synchronization rule is carried in the request message; and the synchronous node locking the best valid reference source according to the synchronization rule, and outputting information of the reference source to another port, and, wherein the method further comprises:

when determining that there is no other valid reference source according to the synchronization rule, the synchronous node entering a hold mode and transmitting a failure message to the controller.

12. The method according to claim 10, wherein the method further comprises:

after receiving a switching request message transmitted by the controller, the synchronous node switching to an alternative reference source and transmitting a switching message to a first upstream synchronous node of the synchronous node, and, wherein the method further comprises: after receiving the switching message, the first upstream synchronous node judging whether the received switching message is legal according to the synchronization rule;

when judging that the received switching message is illegal, discarding the switching message; and when judging that the received switching message is legal, performing reference source switching according to the synchronization rule and transmitting a switching completion message to the controller; when determining that the first upstream synchronous node itself has a valid input reference source, forwarding the switching message to a port having the valid input reference source to notify an upstream node, or forwarding the switching message to the port having the valid input reference source to notify the upstream node after a delay time; and when determining that the first upstream synchronous node itself does not have a valid input reference source, not forwarding the switching message.

13. A controller comprising a first determination unit, a generation unit and a first transmission unit, wherein:

the first determination unit is arranged to determine synchronization link topology information of a synchronous network according to physical link topology information of the synchronous network and synchronization information of a synchronous node in the synchronous network;

the generation unit is arranged to generate a synchronization rule of the synchronous node according to the synchronization link topology information; and the first transmission unit is arranged to transmit the synchronization rule and/or a request message to the synchronous node in the synchronous network according to the synchronization link topology information;

wherein the controller further comprises an acquisition unit and a detection unit, wherein the acquisition unit is arranged to acquire the synchronization information of the synchronous node in the synchronous network; and the detection unit is arranged to detect a physical connection relationship of ports between synchronous nodes to acquire the physical link topology information;

and, the controller further comprises a first reception unit and an update unit, wherein the first reception unit is arranged to receive a switching completion message transmitted by the synchronous node and trigger the update unit; and the update unit is arranged to update the synchronization link topology information and/or the synchronization rule.

14. The controller according to claim 13, wherein when the update unit is arranged to update the synchronization link topology information and the synchronization rule, the update unit is further arranged to update the synchronization link topology information according to the physical link topology information of the synchronous network and the synchronization information of the synchronous node in the synchronous network; and update the synchronization rule according to the synchronization link topology information, or, wherein when the update unit is arranged to update the synchronization link topology information and the synchronization rule, identity information of a best reference source is carried in the switching completion message; and correspondingly, the update unit is further arranged to update the synchronization link topology information and the synchronization rule according to the identity information of the best reference source.

15. The controller according to claim 13, wherein the first transmission unit is further arranged to determine a synchronous node required to be resynchronized according to the updated synchronization link topology information; and carry the updated synchronization rule in an established request message to transmit to the synchronous node required to be resynchronized.

16. The controller according to claim 13, wherein the controller further comprises a first judgment unit, wherein
the first reception unit is further arranged to receive a failure message transmitted by the synchronous node, and trigger the first judgment unit;
the first judgment unit is arranged to judge whether there is an alternative reference source for all the downstream nodes of the synchronous node, and if there is an alternative reference source for all the downstream nodes of the synchronous node, trigger the first transmission unit; and
the first transmission unit is arranged to transmit a switching request message to a downstream node having the alternative reference source.

17. The controller according to claim 13, wherein the first determination unit is further arranged to, when judging that there is no alternative reference source for all the downstream nodes of the synchronous node, determine a first downstream node having a clock with a higher quality level or better hold performance from the downstream nodes of the synchronous node, and trigger the transmission unit; and
the first transmission unit is arranged to transmit a hold request message to the first downstream node to request the first downstream node to enter a hold mode.

18. The controller according to claim 13, wherein when the first transmission unit is arranged to transmit a request message to the synchronous node in the synchronous network according to the synchronization link topology information, the synchronization rule is carried in the request message.

* * * * *